(12) United States Patent
Ikemoto et al.

(10) Patent No.: US 7,751,669 B2
(45) Date of Patent: Jul. 6, 2010

(54) WAVEGUIDE AND DEVICE INCLUDING THE SAME

(75) Inventors: Kiyokatsu Ikemoto, Yokohama (JP); Akinari Takagi, Yokosuka (JP); Hikaru Hoshi, Yokohama (JP); Kazuya Nobayashi, Kawasaki (JP); Aihiko Numata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/558,563

(22) Filed: Nov. 10, 2006

(65) Prior Publication Data
US 2007/0110382 A1    May 17, 2007

(30) Foreign Application Priority Data
Nov. 14, 2005    (JP)    ............... 2005-329024

(51) Int. Cl.
*G02B 6/10* (2006.01)
*G02B 6/12* (2006.01)
*G02B 6/26* (2006.01)

(52) U.S. Cl. .................. 385/131; 385/14; 385/28; 385/129

(58) Field of Classification Search .................. None
See application file for complete search history.

(56) References Cited

U.S. PATENT DOCUMENTS

| | | | | |
|---|---|---|---|---|
| 6,690,876 B2* | 2/2004 | Sigalas | ............... | 385/146 |
| 7,362,935 B2* | 4/2008 | Koike et al. | ............... | 385/50 |
| 2004/0001683 A1* | 1/2004 | Lau et al. | ............... | 385/129 |
| 2004/0264903 A1 | 12/2004 | Dridi et al. | | |
| 2005/0207717 A1* | 9/2005 | Takagi et al. | ............... | 385/129 |

FOREIGN PATENT DOCUMENTS

| | | |
|---|---|---|
| EP | 1574884 A | 9/2005 |
| JP | 2001-074955 A | 3/2001 |

OTHER PUBLICATIONS

Eli Yablonovitch, "Inhibited Spontaneous Emission in Solid-State Physics and Electronics", Physical Review Letters, vol. 58, pp. 2059-2062, 1987.

Extended Abstract of the 65th Meeting of the Japan Society of Applied Physics, No. 3, pp. 936, Sep. 2004, Tohoku Gakiun University.

Sell, Curtis et al. "Waveguide networks in three-dimensional layer-by-layer photonic crystals", Applied Physics Letters, AIP, American Institute of Physics, Melville, NY, vol. 84, No. 23, Jun. 7, 2004, pp. 4605-4607.

* cited by examiner

*Primary Examiner*—Omar Rojas
(74) *Attorney, Agent, or Firm*—Canon U.S.A., Inc. I.P. Division

(57) ABSTRACT

At least one exemplary embodiment is directed to a waveguide, which includes a three-dimensional photonic crystal including a first linear defect and a second linear defect. The first linear defect is disposed at part of columnar structures and is formed of a medium different from the columnar structures. The second linear defect is disposed at part of columnar structures extending in the longitudinal direction of the first linear defect and is formed of a medium having a refractive index different from that of the medium used for the columnar structures. The second linear defect is separated from the first linear defect by a distance of at least 0.5 times the out-of-plane lattice period of the three-dimensional photonic crystal in a direction in which layers including the columnar structures are stacked.

19 Claims, 22 Drawing Sheets

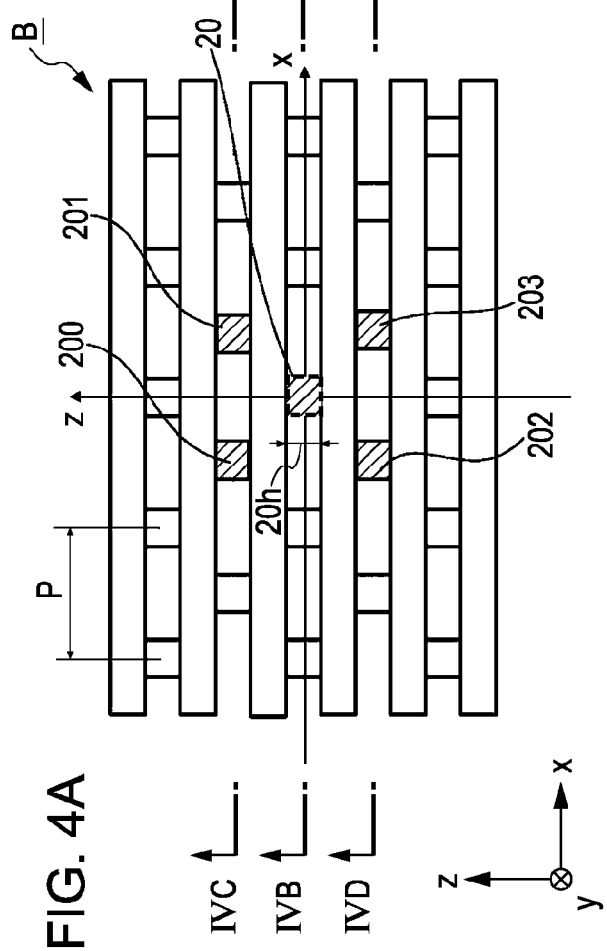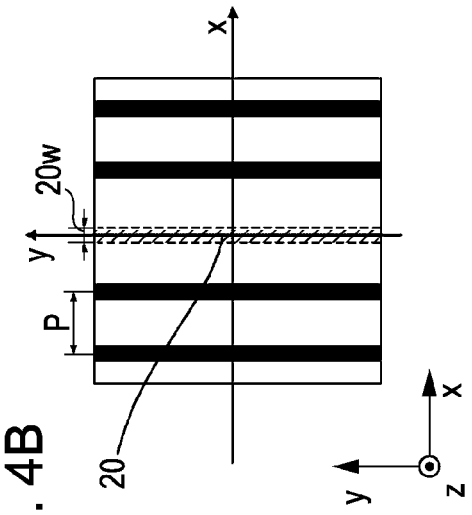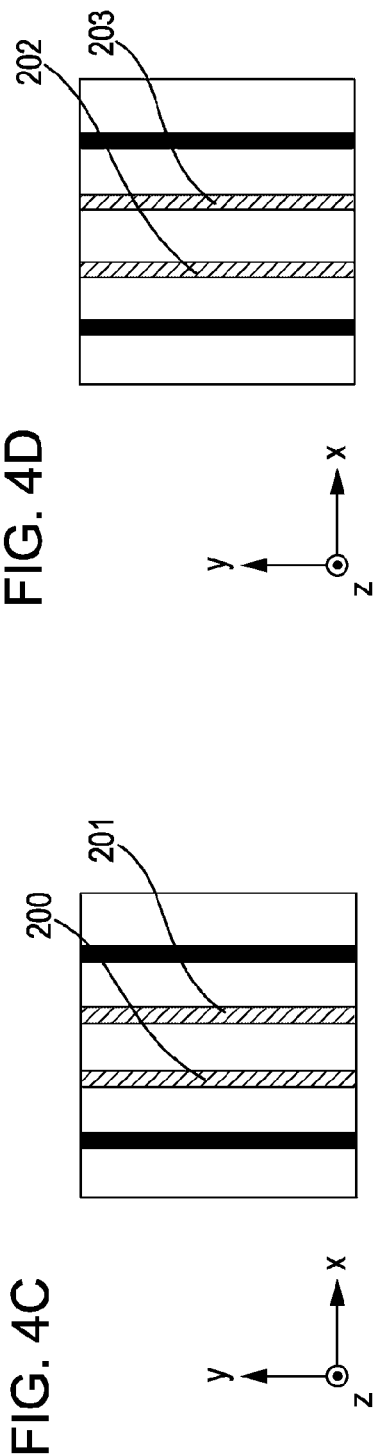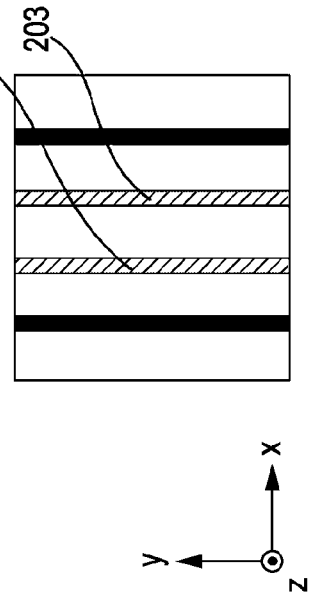

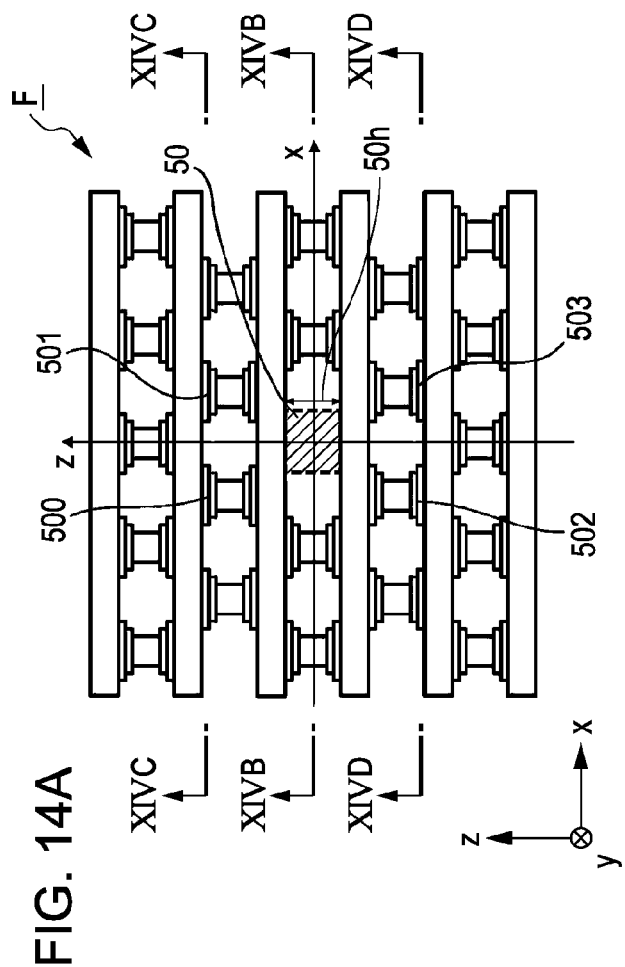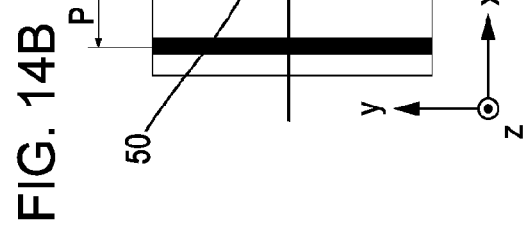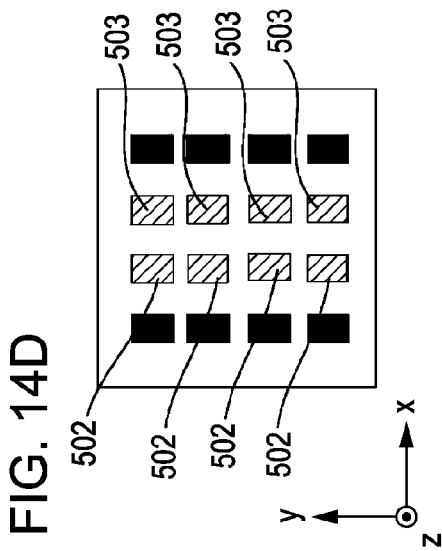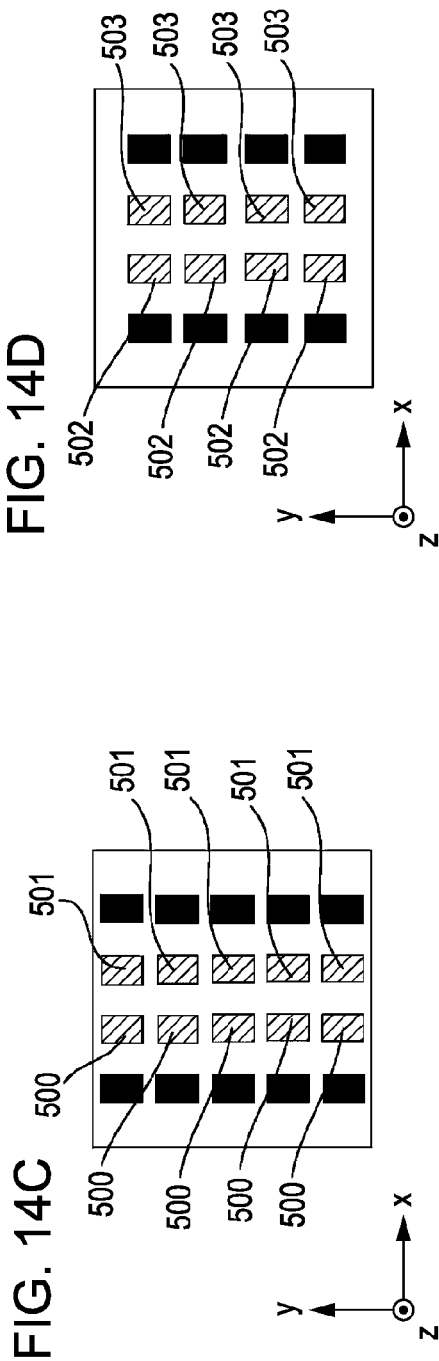

500n, 501n, 502n, 503n 400n, 401n, 402n, 403n

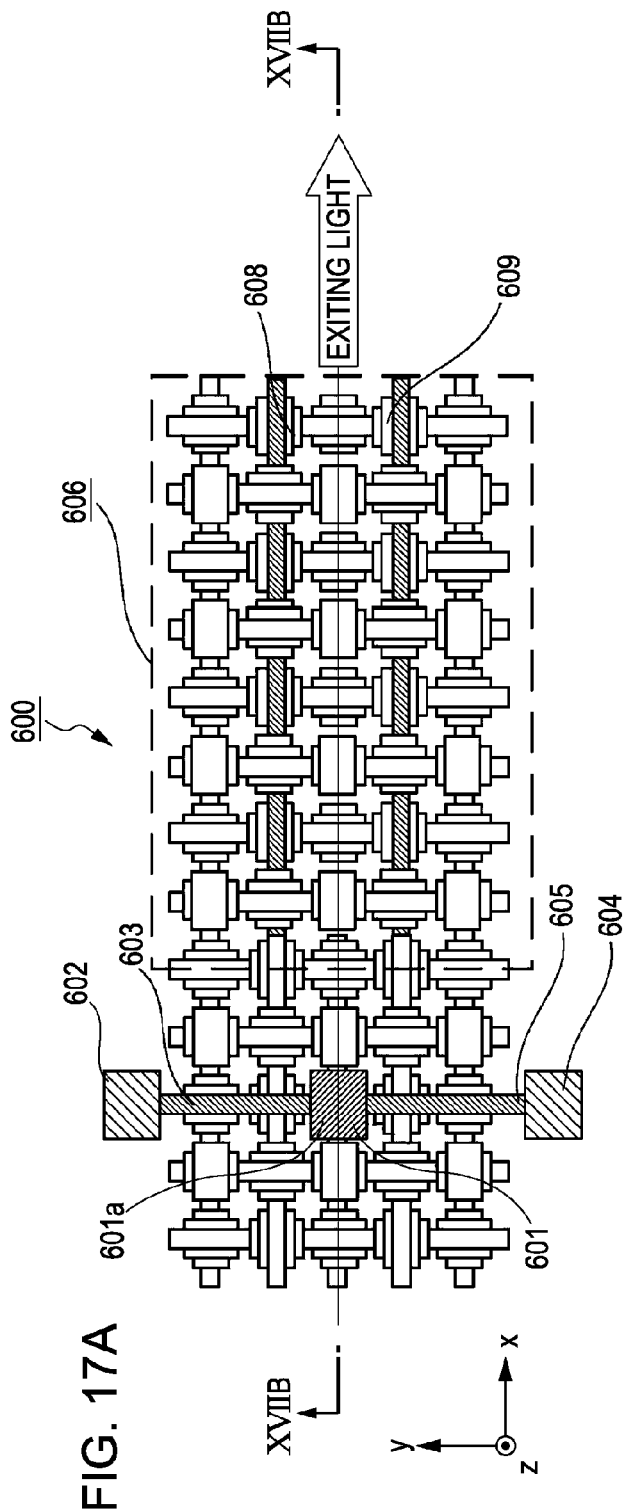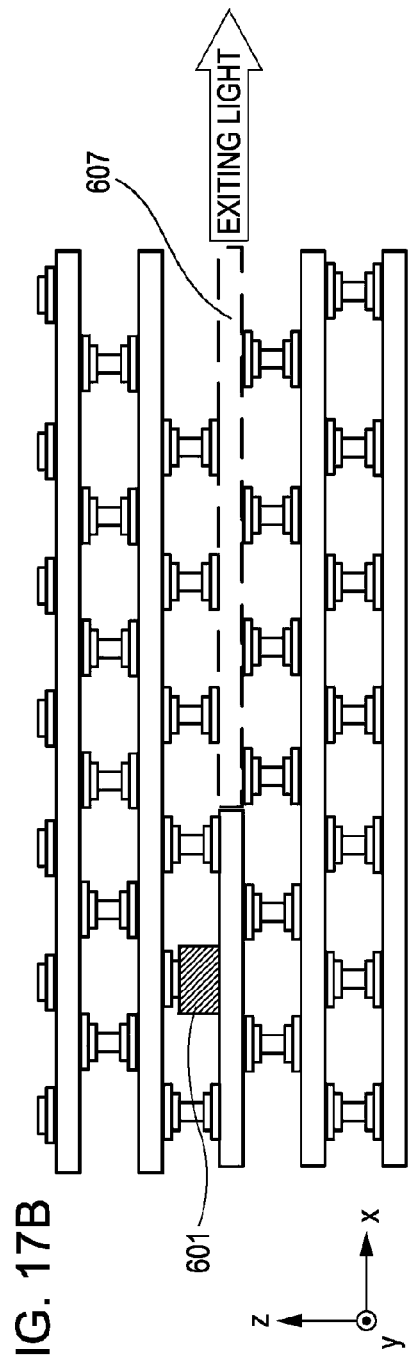
FIG. 17A
FIG. 17B

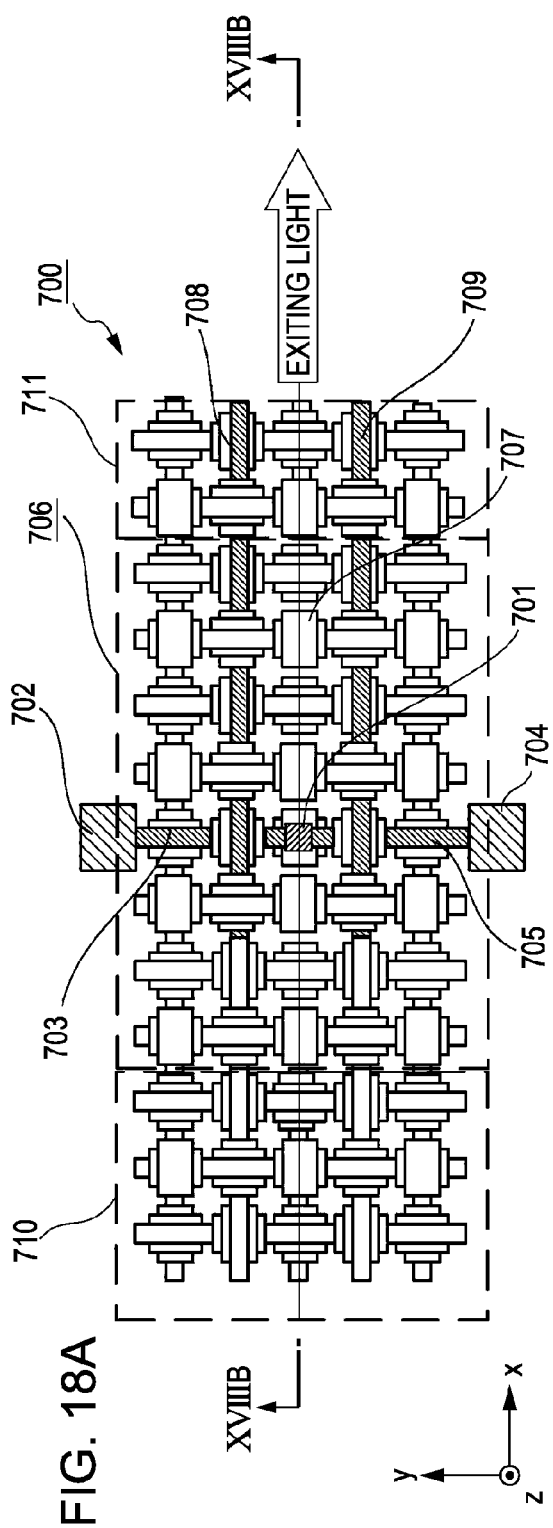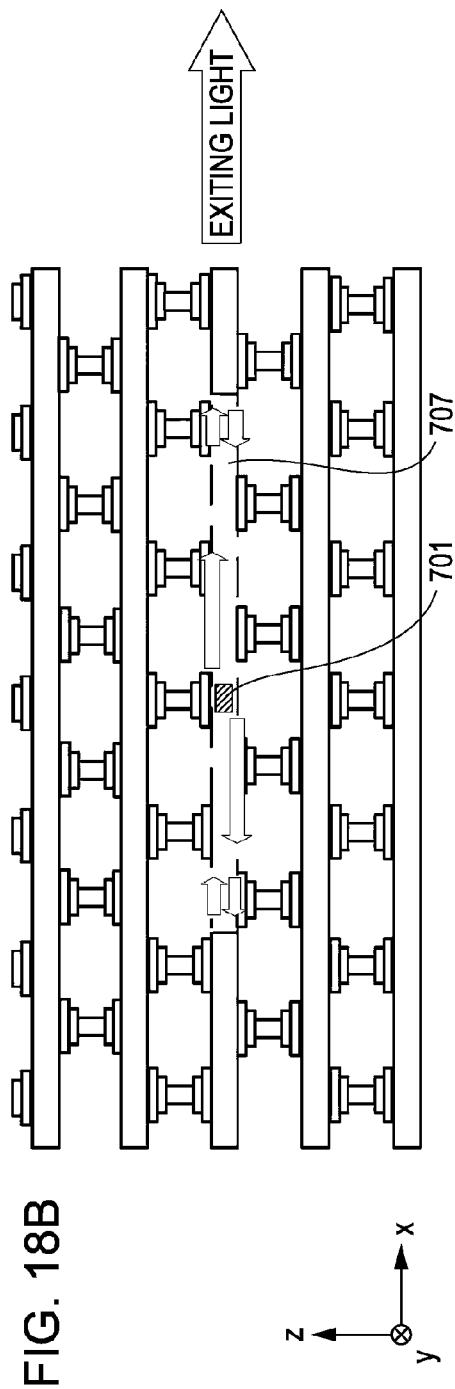

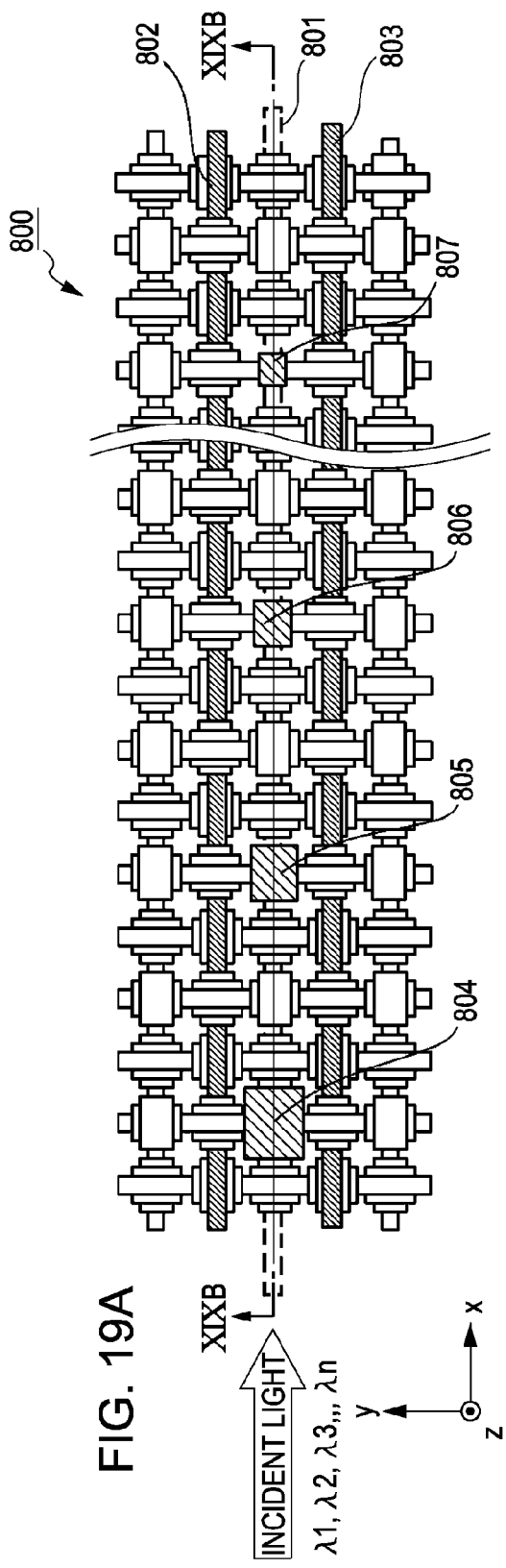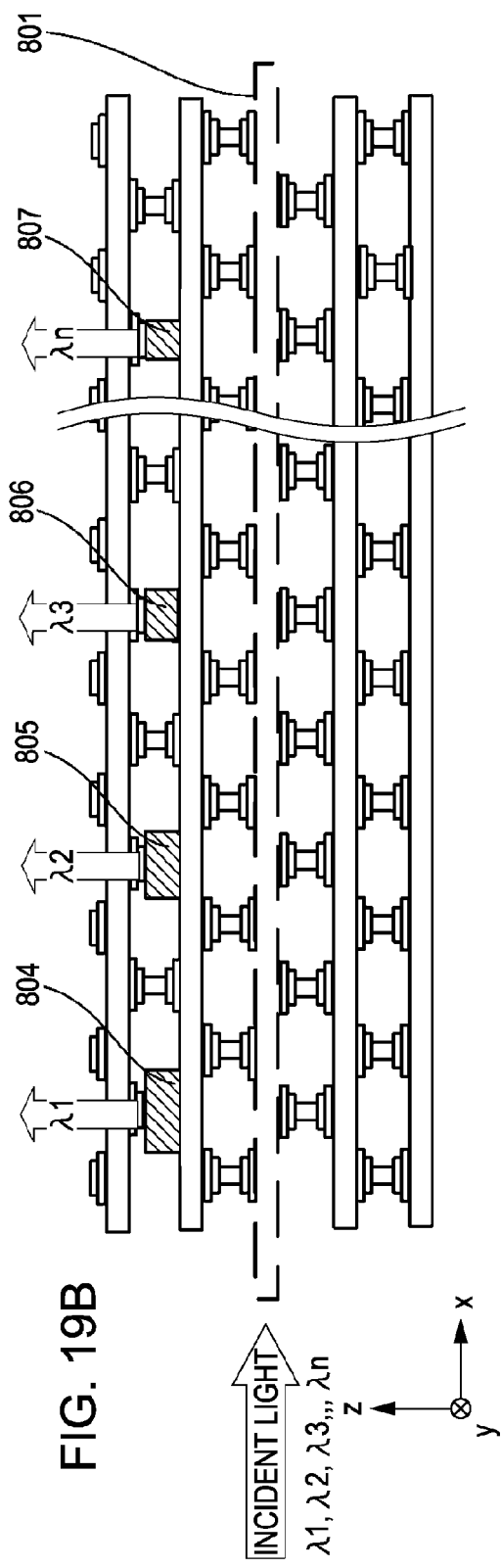

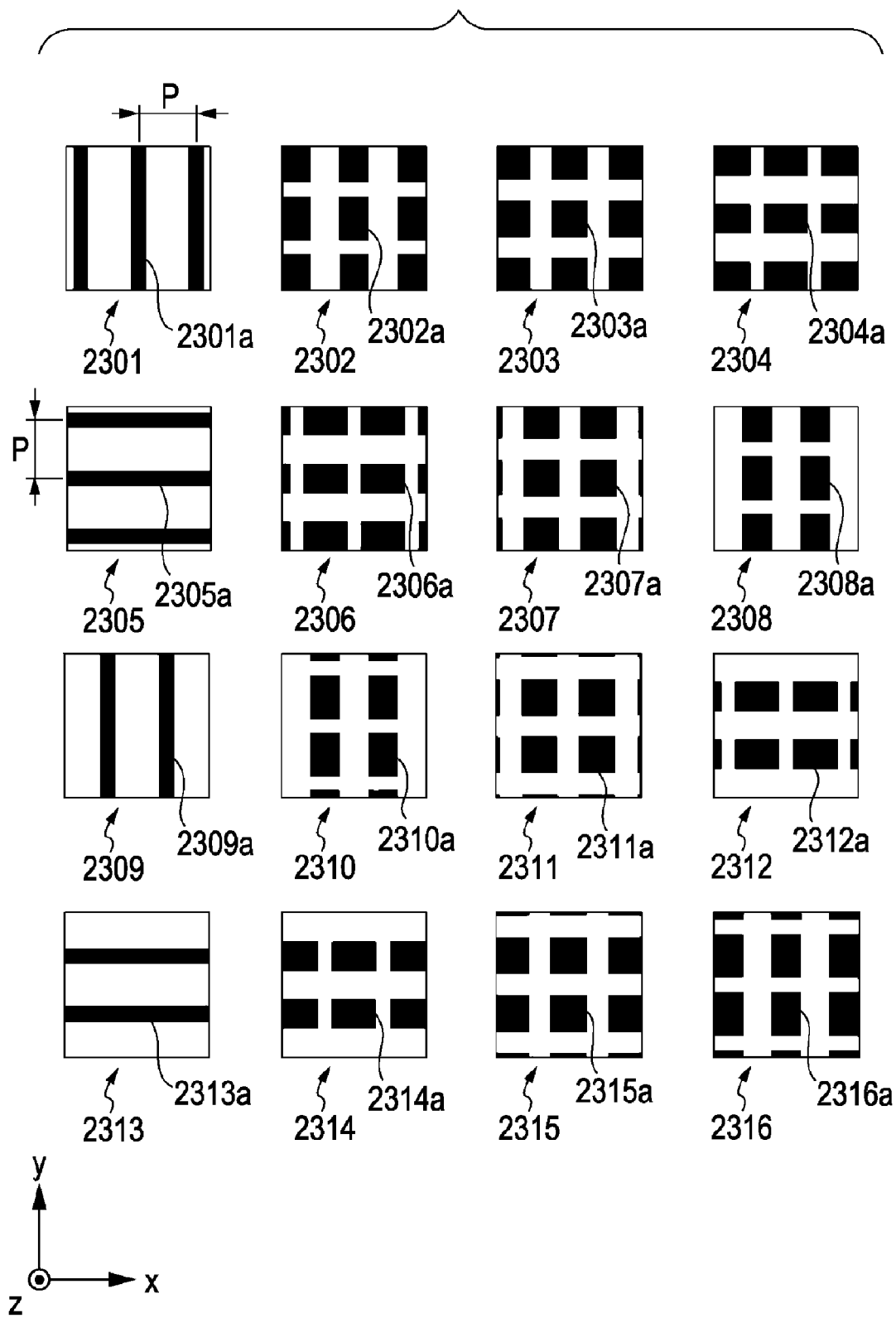

WAVEGUIDE AND DEVICE INCLUDING THE SAME

CROSS-REFERENCE TO RELATED APPLICATIONS

This application is related to the following application filed on the same day and assigned to the same assignee as the present application:
"WAVEGUIDE AND DEVICE INCLUDING THE SAME"—application Ser. No. 11/558,561.

BACKGROUND OF THE INVENTION

1. Field of the Invention

The present invention relates to waveguides composed of three-dimensional photonic crystals having a three-dimensional refractive index periodic structure and also to devices including the waveguides.

2. Description of the Related Art

Yablonovitch has proposed the idea of controlling transmission/reflection characteristics for electromagnetic waves using subwavelength structures (see Physical Review Letters, Vol. 58, p. 2059, 1987). According to the document, transmission/reflection characteristics for electromagnetic waves can be controlled using periodic subwavelength structures. This control is also possible for light, that is, electromagnetic waves having wavelengths on the order of those of light. This document suggests that such structures, known as photonic crystals, facilitate the realization of a reflective mirror with a reflectance of 100%, which means no optical loss, in a certain wavelength range. The concept of providing a reflectance of 100% in a certain wavelength range is known as a photonic bandgap from an analogy to an energy gap of a semiconductor.

A three-dimensional subwavelength periodic structure can provide a photonic bandgap for light incident in any direction. Such a photonic bandgap is hereinafter referred to as a complete photonic bandgap. A complete photonic bandgap can be used to realize optical elements having new functions. For example, a photonic crystal having a point or linear defect in its periodic structure can operate as a resonator or a waveguide. In particular, it has been known that a sharply curved waveguide or an add-drop waveguide can be provided by forming a linear defect so that it can reliably trap light (see Japanese Patent Laid-Open No. 2001-74955 and Extended Abstracts of the 65th Autumn Meeting of the Japan Society of Applied Physics, No. 3, p. 936).

FIGS. 21A to 21F show three-dimensional photonic crystal structures capable of providing a complete photonic bandgap. FIG. 21A shows a diamond opal structure. FIG. 21B shows a woodpile structure. FIG. 21C shows a spiral structure. FIG. 21D shows a special three-dimensional structure. FIG. 21E shows an inverse three-dimensional periodic structure. FIG. 21F shows a diamond woodpile structure.

For a waveguide composed of a three-dimensional photonic crystal having a complete photonic bandgap, its photonic bandgap generally includes a frequency range where light propagates in a single mode and a frequency range where light propagates in multiple modes. A single mode herein refers to a mode where light of certain wavelength propagates through the waveguide with a single wave vector. Each propagation mode has its own periodic electromagnetic field intensity distribution in the waveguide.

A waveguide used for optical circuits and light-emitting devices, for example, requires a light-trapping effect and the ability to facilitate the propagation of light of a desired wavelength in a single mode. In addition, a single-peaked electromagnetic field intensity distribution symmetrical in a plane perpendicular to a propagation direction is desired for light emitted from an end of the waveguide. The electromagnetic field intensity distribution of the light emitted from the end of the waveguide depends on the electromagnetic field intensity distribution of each propagation mode in the plane perpendicular to the propagation direction at the end of the waveguide. Accordingly, a propagation mode is desired which has a single-peaked electromagnetic field intensity distribution highly concentrated in a certain area in the plane perpendicular to the propagation direction.

Japanese Patent Laid-Open No. 2001-74955 discusses a waveguide having a linear defect in its woodpile structure, as shown in FIG. 21B. The linear defect is formed by removing part of a columnar structure included in the woodpile structure. According to this publication, the waveguide structure facilitates single-mode propagation with a nearly single-peaked electromagnetic field intensity distribution in a particular frequency range. This waveguide, however, can have a limited frequency range available because light propagates in multiple modes in part of the frequency range of the photonic bandgap thereof. In addition, the photonic bandgap and the frequency range that facilitates single-mode propagation are significantly narrowed if the three-dimensional photonic crystal is composed of a medium with a low refractive index.

Extended Abstracts of the 65th Autumn Meeting of the Japan Society of Applied Physics, No. 3, p. 936 discuss a waveguide structure that facilitates the propagation of light in a single mode in a relatively wide frequency range. FIG. 22A shows the electromagnetic field intensity distribution of the light in a plane perpendicular to a propagation direction. FIG. 22B shows the electromagnetic field intensity distribution of the light in a plane parallel to the propagation direction and a stacking direction. In FIGS. 22A and 22B, central white areas represent higher electromagnetic field intensity. FIG. 22A shows a double-peaked electromagnetic field intensity distribution that is highly concentrated on additional columnar structures. The double-peaked distribution is undesirable in terms of application. FIG. 22B shows that the electromagnetic field intensity distribution varies largely along the waveguide structure. If the waveguide structure is disposed in the three-dimensional photonic crystal in combination with another resonator or waveguide structure, even slight variations in the positions of the structures due to manufacturing errors, for example, largely vary the electromagnetic field intensity distributions thereof. The properties of propagation of electromagnetic fields between the structures depend on the positional relationship between the electromagnetic field intensity distributions thereof. Even slight variations in the positions of the structures largely vary the properties of propagation of electromagnetic fields between the structures, thus significantly varying device performance. Accordingly, manufacture of devices having the waveguide structure with desired performance requires a sophisticated manufacturing technology because individual structures must be positioned with high accuracy.

Furthermore, the two waveguide structures described above cannot provide single-mode propagation in a desired frequency range because no technique is available to change the frequency of propagation mode.

SUMMARY OF THE INVENTION

At least one exemplary embodiment of the present invention is directed to a three-dimensional photonic crystal waveguide that facilitates single-mode propagation in a desired frequency range with a single-peaked electromagnetic field intensity distribution in a plane perpendicular to a propagation direction.

A waveguide according to at least one exemplary embodiment of the present invention includes a three-dimensional photonic crystal including a first layer including columnar structures arranged at a predetermined interval, a second layer including columnar structures arranged at the interval so as to extend in a direction different from a longitudinal direction of the columnar structures of the first layer, a third layer including columnar structures arranged at the interval so as to extend in the longitudinal direction of the columnar structures of the first layer, and a fourth layer including columnar structures arranged at the interval so as to extend in a longitudinal direction of the columnar structures of the second layer. The columnar structures of the third layer are shifted from the columnar structures of the first layer by half the interval in a direction perpendicular to the longitudinal direction thereof. The columnar structures of the fourth layer are shifted from the columnar structures of the second layer by half the interval in a direction perpendicular to the longitudinal direction thereof. The three-dimensional photonic crystal further includes a first linear defect disposed at part of the columnar structures and a second linear defect disposed at part of the columnar structures extending in the longitudinal direction of the first linear defect. The first linear defect is formed of a medium different from the columnar structures. The second linear defect is formed of a medium having a refractive index different from that of the medium used for the columnar structures. The second linear defect is separated from the first linear defect by a distance of at least 0.5 times the out-of-plane lattice period of the three-dimensional photonic crystal in a direction in which the layers are stacked.

Further features of the present invention will become apparent from the following description of exemplary embodiments with reference to the attached drawings.

BRIEF DESCRIPTION OF THE DRAWINGS

FIGS. 4A to 4D are schematic diagrams of a waveguide structure according to a first exemplary embodiment of the present invention.

FIGS. 14A to 14D are schematic diagrams of another waveguide structure according to the second exemplary embodiment of the present invention.

FIGS. 17A and 17B are schematic diagrams of a light-emitting device according to a third exemplary embodiment of the present invention.

FIGS. 18A and 18B are schematic diagrams of another light-emitting device according to the third exemplary embodiment.

FIGS. 19A and 19B are schematic diagrams of a drop circuit according to the third exemplary embodiment.

FIG. 24B is a set of schematic diagrams illustrating layers of the photonic crystal shown in FIG. 24A.

DESCRIPTION OF THE EMBODIMENTS

First Exemplary Embodiment

Figure 1:
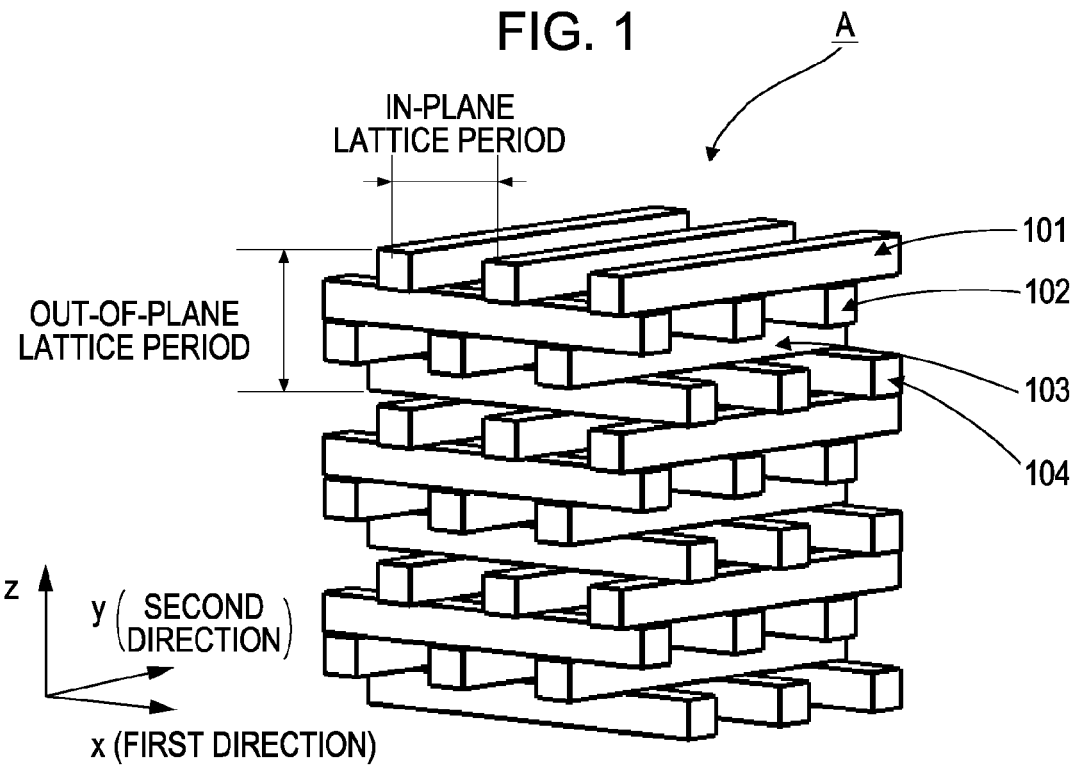
FIG. 1 is a schematic diagram of a photonic crystal having a woodpile structure.

FIG. 1 is a schematic diagram of a woodpile structure A. The woodpile structure A has a regular period including a first layer 101, a second layer 102, a third layer 103, and a fourth layer 104 that are parallel to the xy plane.

Figure 2:
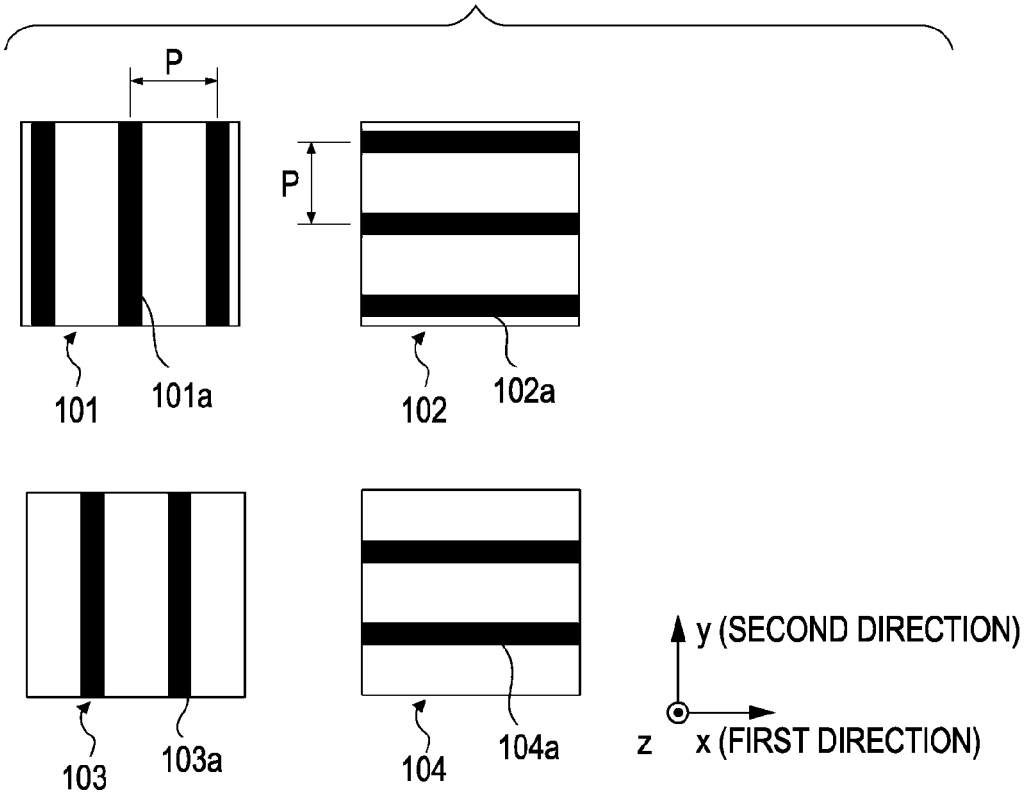
FIG. 2 is a set of schematic diagrams illustrating layers of the photonic crystal shown in FIG. 1.

FIG. 2 shows parts of xy cross sections of the four layers 101 to 104 in FIG. 1. The first layer 101 and the third layer 103 include columnar structures 101a and 103a, respectively, periodically arranged at an interval of P in the x-axis direction so as to extend perpendicularly to the x-axis direction, namely, in the y-axis direction. The columnar structures 101a and 103a are shifted from each other by a distance of P/2 in the x-axis direction. The second layer 102 and the fourth layer 104 include columnar structures 102a and 104a, respectively, periodically arranged at an interval of P in the y-axis direction so as to extend perpendicularly to the y-axis direction, namely, in the x-axis direction. The columnar structures 102a and 104a are shifted from each other by a distance of P/2 in the y-axis direction.

A complete photonic bandgap can be achieved in a target frequency range (wavelength range) by optimizing, for example, the refractive index of the material used for the columnar structures 101a to 104a, the shape and interval of the columnar structures 101a to 104a, and the thicknesses of the layers 101 to 104.

Table 1 shows structural parameters of the woodpile structure A. In Table 1, the refractive index refers to that of the medium (material) used for the columnar structures 101a to 104a of the woodpile structure A. The medium used for the portions other than the columnar structures 101a to 104a is air, which has a refractive index of 1.0. The in-plane lattice period refers to the interval of the columnar structures 101a to 104a, namely, P. The out-of-plane lattice period refers to the total length of the four layers 101 to 104 in the stacking direction in the woodpile structure A. The columnar structure width refers to the width of each columnar structure in a direction perpendicular to the longitudinal direction thereof and parallel to the layers 101 to 104. The columnar structure height refers to the height of each columnar structure in the stacking direction (z-axis direction).

TABLE 1

| Woodpile structure A Photonic crystal structure | |
|---|---|
| Refractive index | 2.4 |
| In-plane lattice period | P |
| Out-of-plane lattice period | 1.4 P |
| Columnar structure width | 0.35 P |
| Columnar structure height | 0.35 P |

Figure 3:
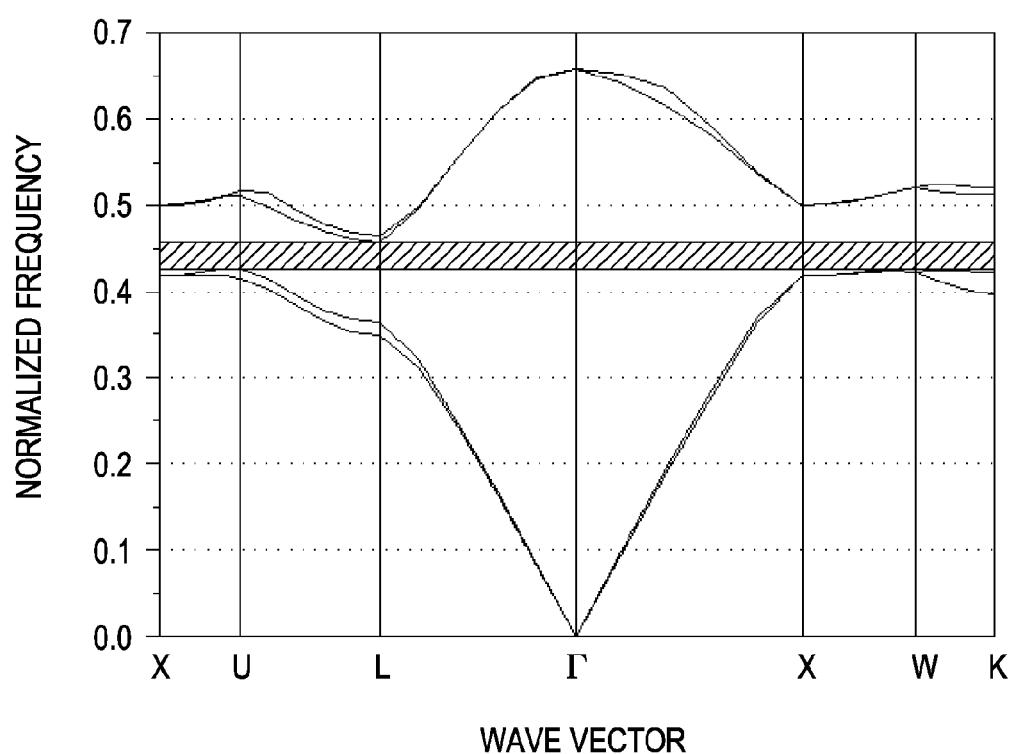
FIG. 3 is a graph showing the normalized frequency of the photonic crystal shown in FIG. 1.

FIG. 3 is a graph showing a photonic bandgap of the woodpile structure A according to calculations by a plane-wave expansion method. In this graph, the horizontal axis represents wave vectors, that is, directions in which an electromagnetic wave enters the photonic crystal. For example, the K point represents a wave vector parallel to the x-axis (or the y-axis), and the X point represents a wave vector oriented at an angle of 45° with respect to the x-axis (or the y-axis) in the xy plane. The vertical axis represents frequencies normalized with respect to lattice period. The hatched area represents the frequency range of a complete photonic bandgap, which forbids propagation of light incident in any direction.

A defect formed in the three-dimensional photonic crystal disturbs the periodicity thereof to create a defect mode in the complete photonic bandgap. The frequency and wave vector of the defect mode depends on the shape and medium thereof. If a linear defect is formed, the magnitude of the wave vector is not limited in the longitudinal direction of the linear defect, and thus the defect mode facilitates propagation in that direction.

FIGS. 4A to 4D are schematic diagrams of a waveguide structure B according to the first exemplary embodiment of the present invention. This waveguide structure B is produced by forming a first linear defect 20 and second linear defects 200 to 203 in the woodpile structure A of FIG. 1. The first linear defect 20 extends in the y-axis direction. The second linear defects 200 to 203 are formed at parts of columnar structures extending in the y-axis direction. FIG. 4A is a sectional view of the waveguide structure B which is taken along the xz plane. FIGS. 4B, 4C, and 4D are sectional views taken along lines IVB, IVC, and IVD, respectively, of FIG. 4A. The second linear defects 200 to 203 are formed of a medium with a refractive index different from that of the medium used for the columnar structures.

In this exemplary embodiment, the second linear defects 200 to 203 are formed of a medium with a refractive index of about 2.0. The first linear defect 20 is formed by removing part of the columnar structures.

Table 2 shows structural parameters of the waveguide structure B, where the origin of coordinates is the center of the first linear defect 20 in the xz plane. In Table 2 and FIGS. 4A to 4D, the defect width 20w refers to the width of the first linear defect 20 in the x-axis direction. The defect height 20h refers to the height of the first linear defect 20 in the stacking direction. The defect refractive indices 20n, 200n, 201n, 202n, and 203n refer to the refractive indices of the linear defects 20, 200, 201, 202, and 203, respectively.

TABLE 2

| Waveguide structure B | |
|---|---|
| Photonic crystal structure | |
| Refractive index | 2.4 |
| In-plane lattice period | P |
| Out-of-plane lattice period | 1.4 P |
| Columnar structure width | 0.35 P |
| Columnar structure height | 0.35 P |
| First linear defect 20 | |
| Center coordinates (x, z) | (0.00 P, 0.00 P) |
| Defect refractive index 20n | 1.0 |
| Defect width 20 w | 0.35 P |
| Defect height 20 h | 0.35 P |
| Second linear defect 200 | |
| Center coordinates (x, z) | (−0.50 P, 0.70 P) |
| Defect refractive index 200n | 2.0 |
| Second linear defect 201 | |
| Center coordinates (x, z) | (0.50 P, 0.70 P) |
| Defect refractive index 201n | 2.0 |
| Second linear defect 202 | |
| Center coordinates (x, z) | (−0.50 P, −0.70 P) |
| Defect refractive index 202n | 2.0 |
| Second linear defect 203 | |
| Center coordinates (x, z) | (0.50 P, −0.70 P) |
| Defect refractive index 203n | 2.0 |

Figure 5A:
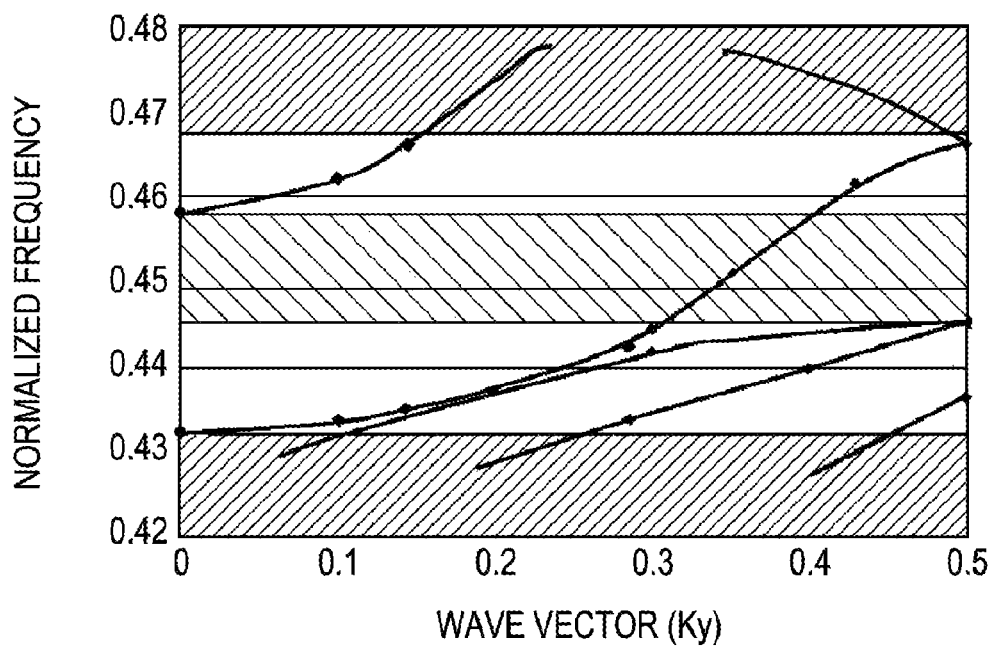
FIGS. 5A and 5B are a graph and a diagram, respectively, showing propagation modes of the waveguide structure according to the first exemplary embodiment.

FIG. 5A is a graph showing propagation modes of the waveguide structure B according to calculations by a finite-difference time-domain (FDTD) method. In the graph, the horizontal axis represents the magnitudes of propagation direction components (y-axis direction components) of wave vectors normalized with respect to the lattice period, namely, P, and the vertical axis represents frequencies normalized with respect to the lattice period, namely, P. The marginal hatched areas represent the frequency ranges other than a complete photonic bandgap. Propagation modes appearing in the complete photonic bandgap are defect modes due to the linear defects 20 and 200 to 203.

The central hatched area represents a frequency range that facilitates propagation of the defect modes in a single mode. The frequency range that facilitates single-mode propagation is about 0.446 to about 0.458. If the first linear defect 20 is formed in the waveguide structure B without the second linear defects 200 to 203, the frequency range that facilitates single-mode propagation is calculated to be about 0.433 to about 0.440 according to the FDTD method. These results demonstrate that the second linear defects 200 to 203 facilitate single-mode propagation over a wider frequency range.

Figure 5B:
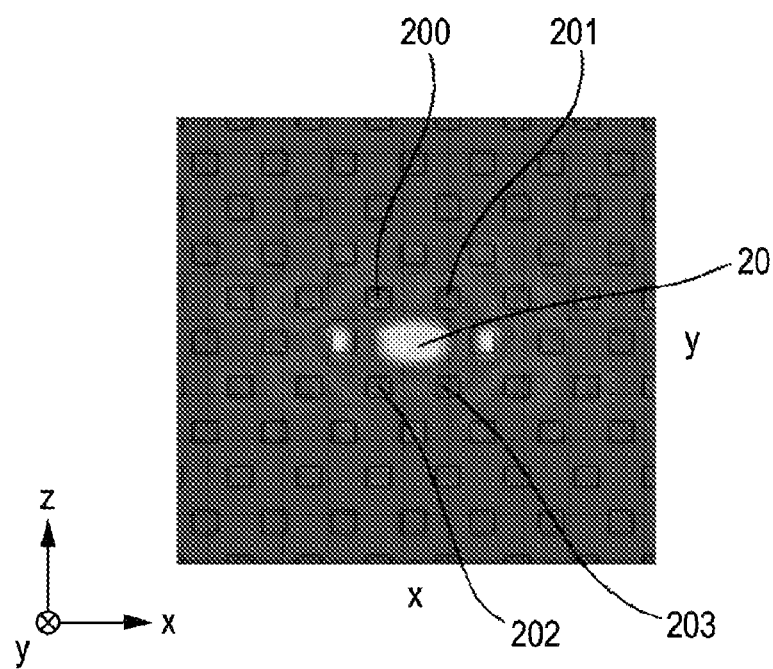

FIG. 5B shows the electromagnetic field intensity distribution of a propagation mode in the frequency range that facilitates single-mode propagation in the xz plane. The white areas represent higher electromagnetic field intensities. FIG. 5B shows a single-peaked electromagnetic field intensity distribution that is highly concentrated around the center of the waveguide structure B.

Figure 6:
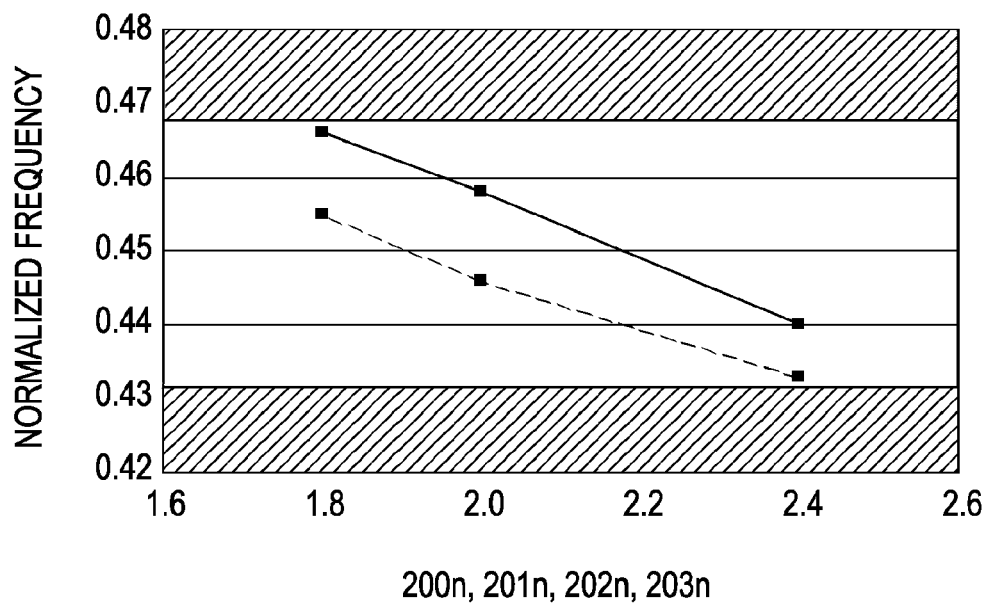
FIG. 6 is a graph showing the normalized frequency of the waveguide structure according to the first exemplary embodiment.

FIG. 6 is a graph showing variations in the frequency range that facilitates single-mode propagation after the defect refractive indices 200n to 203n of the second linear defects 200 to 203 are simultaneously changed in equal amounts.

In FIG. 6, the horizontal axis represents defect refractive indices, and the vertical axis represents normalized frequencies. The solid line represents the high-frequency side of the frequency range that facilitates single-mode propagation, and the broken line represents the low-frequency side thereof. The frequency range that facilitates single-mode propagation varies with the defect refractive indices 200n to 203n. That is, the defect refractive indices 200n to 203n can be changed by selecting the medium used for the second linear defects 200 to 203 to control the frequency range that facilitates single-mode propagation.

The reason why the frequency range that facilitates single-mode propagation can be controlled to provide a propagation mode with a single-peaked distribution in a plane perpendicular to the propagation direction will be described below.

A propagation mode close to the low-frequency side of the photonic bandgap has an electromagnetic field intensity distribution that is relatively highly concentrated on the linear defects 20 and 200 to 203. In contrast, a propagation mode close to the high-frequency side of the photonic bandgap has an electromagnetic field intensity distribution extending farther away from the linear defects, particularly in the stacking direction.

As the relationship between the frequency and wave vector of light depends on the refractive index of the space where the light propagates, the relationship between the frequency and wave vector of a propagation mode depends on mode refractive index. For a fixed wave vector, the mode frequency increases with decreasing mode refractive index. The mode refractive index depends on the extent to which the electromagnetic field intensity distribution of the mode is concentrated on high-refractive-index parts of a structure. Hence, the mode refractive indices of propagation modes close to the high-frequency side are largely varied by changing the refractive index of the medium used for second linear defects formed at positions away from a first linear defect in the stacking direction. This facilitates large variations in the frequencies of the propagation modes close to the high-frequency side. On the basis of that mechanism, a propagation mode with a desired wavelength close to the high-frequency side can be achieved by appropriately selecting the medium used for the second linear defects to control the frequency range that facilitates single-mode propagation.

If the second linear defects are extremely close to the first linear defect, as in the related art, they largely affect the electromagnetic field intensity distribution of a propagation mode. Because the electromagnetic field intensity distribution tends to be concentrated on high-refractive-index parts, the propagation mode has a double-peaked electromagnetic field intensity distribution concentrated on the second linear defects in a plane perpendicular to the propagation direction.

In the waveguide structure B according to this exemplary embodiment, by contrast, the second linear defects 200 to 203 have little effect on the electromagnetic field intensity distribution of a propagation mode because they are located at positions away from the first linear defect 20. Accordingly, the propagation mode has a single-peaked electromagnetic field intensity distribution that is highly concentrated on the first linear defect 20 in a plane perpendicular to the propagation direction.

The second linear defects 200 to 203 are formed in the columnar structures closest to the first linear defect 20 in this exemplary embodiment, although the present invention is not limited to the example above. Similar effects can be achieved if the second linear defects 200 to 203 are formed in columnar structures disposed farther away from the first linear defect 20 in the layers closest to the first linear defect 20 which include columnar structures extending in the longitudinal direction of the first linear defect 20.

Also, similar effects can be achieved if the second linear defects 200 to 203 are formed in columnar structures included in layers disposed farther away from the first linear defect 20 in the stacking direction. An effective range of distance between the first linear defect 20 and the second linear defects 200 to 203 in the stacking direction is about 0.5 to about 1.5 times the out-of-plane lattice period. If the second linear defects 200 to 203 are separated from the first linear defect 20 by a distance of less than 0.5 times the out-of-plane lattice period, a propagation mode with a single-peaked electromagnetic field intensity distribution in a plane perpendicular to the propagation direction is difficult to achieve. If the second linear defects 200 to 203 are separated from the first linear defect 20 by a distance of more than 1.5 times the out-of-plane lattice period, the second linear defects 200 to 203 have little effect.

The number of columnar structures containing the second linear defects 200 to 203 is not limited to this exemplary embodiment. In addition, the second linear defects 200 to 203 can be formed of media with different refractive indices.

More exact control of the positions, number, and medium of the second linear defects 200 to 203 permits more exact control of mode frequency.

This exemplary embodiment is independent of the refractive index of the medium used for columnar structures of a photonic crystal. For example, Table 3 shows structural parameters of a waveguide structure C having the same structure as the waveguide structure B shown in FIGS. 4A to 4D. This waveguide structure C includes a three-dimensional photonic crystal including columnar structures formed of a medium having a refractive index of about 3.6.

TABLE 3

| Waveguide structure C | |
|---|---|
| Photonic crystal structure | |
| Refractive index | 3.6 |
| In-plane lattice period | P |
| Out-of-plane lattice period | 1.2 P |
| Columnar structure width | 0.30 P |
| Columnar structure height | 0.30 P |
| First linear defect 20 | |
| Center coordinates (x, z) | (0.00 P, 0.00 P) |
| Defect refractive index 20n | 1.0 |
| Defect width 20 w | 0.30 P |
| Defect height 20 h | 0.30 P |
| Second linear defect 200 | |
| Center coordinates (x, z) | (−0.50 P, 0.60 P) |
| Defect refractive index 200n | 3.0-3.4 |
| Second linear defect 201 | |
| Center coordinates (x, z) | (0.50 P, 0.60 P) |
| Defect refractive index 201n | 3.0-3.4 |
| Second linear defect 202 | |
| Center coordinates (x, z) | (−0.50 P, −0.60 P) |
| Defect refractive index 202n | 3.0-3.4 |
| Second linear defect 203 | |
| Center coordinates (x, z) | (0.50 P, −0.60 P) |
| Defect refractive index 203n | 3.0-3.4 |

Figure 7:
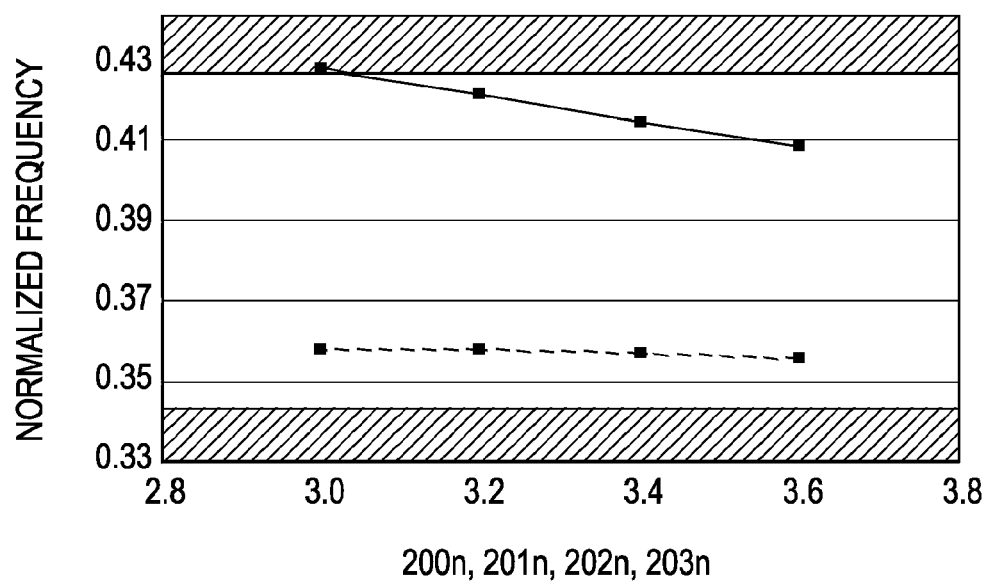
FIG. 7 is a graph showing the normalized frequency of another waveguide structure according to the first exemplary embodiment.

FIG. 7 is a graph showing variations in the frequency range that facilitates single-mode propagation after the defect refractive indices 200n to 203n are simultaneously changed in equal amounts. In FIG. 7, the horizontal axis represents defect refractive indices, and the vertical axis represents normalized frequencies. The solid line represents the high-frequency side of the frequency range that facilitates single-mode propagation, and the broken line represents the low-frequency side thereof. The area defined between these lines represents the frequency range that facilitates single-mode propagation. Propagation modes are calculated by the FDTD method as in FIG. 6. FIG. 7 shows that the frequency range that facilitates single-mode propagation varies with the defect refractive indices 200n to 203n. Hence, the defect refractive indices 200n to 203n can be changed by selecting the medium used for the second linear defects 200 to 203 to control the frequency range that facilitates single-mode propagation independently of the refractive index of the medium used for the three-dimensional photonic crystal.

In this exemplary embodiment, as described above, a waveguide structure can be formed in a woodpile structure to provide a waveguide that facilitates single-mode propagation with a desired intensity distribution in a desired frequency range.

As in the related art, at least two media with a high refractive index ratio can be used to produce three-dimensional photonic crystal waveguide structures as described above. A combination of media with a higher refractive index ratio provides a wider photonic bandgap because a photonic bandgap results from a refractive index distribution in a crystal. An effectively wide photonic bandgap can be achieved with a refractive index ratio of at least 2. The medium used for columnar structures can be a high-refractive-index material such as Si, GaAs, InP, Ge, $TiO_2$, GaN, $Ta_2O_5$, or $Nb_2O_5$. In addition, the medium used for the columnar structures can be a transparent material that exhibits no absorption in the wavelength range used. The medium used for the portions other than the columnar structures can be a low-refractive-index material such as a dielectric (e.g., $SiO_2$), an organic polymer (e.g., PMMA), air, or water. The medium used for a first linear defect, which is formed by removing part of the columnar structures, is not limited to air and can be any of the low-refractive-index materials described above.

Such waveguide structures can be produced by a known process such as a repetitive process of electron-beam lithography patterning and deposition, wafer fusion, or nanoimprinting.

Second Exemplary Embodiment

Figure 8:
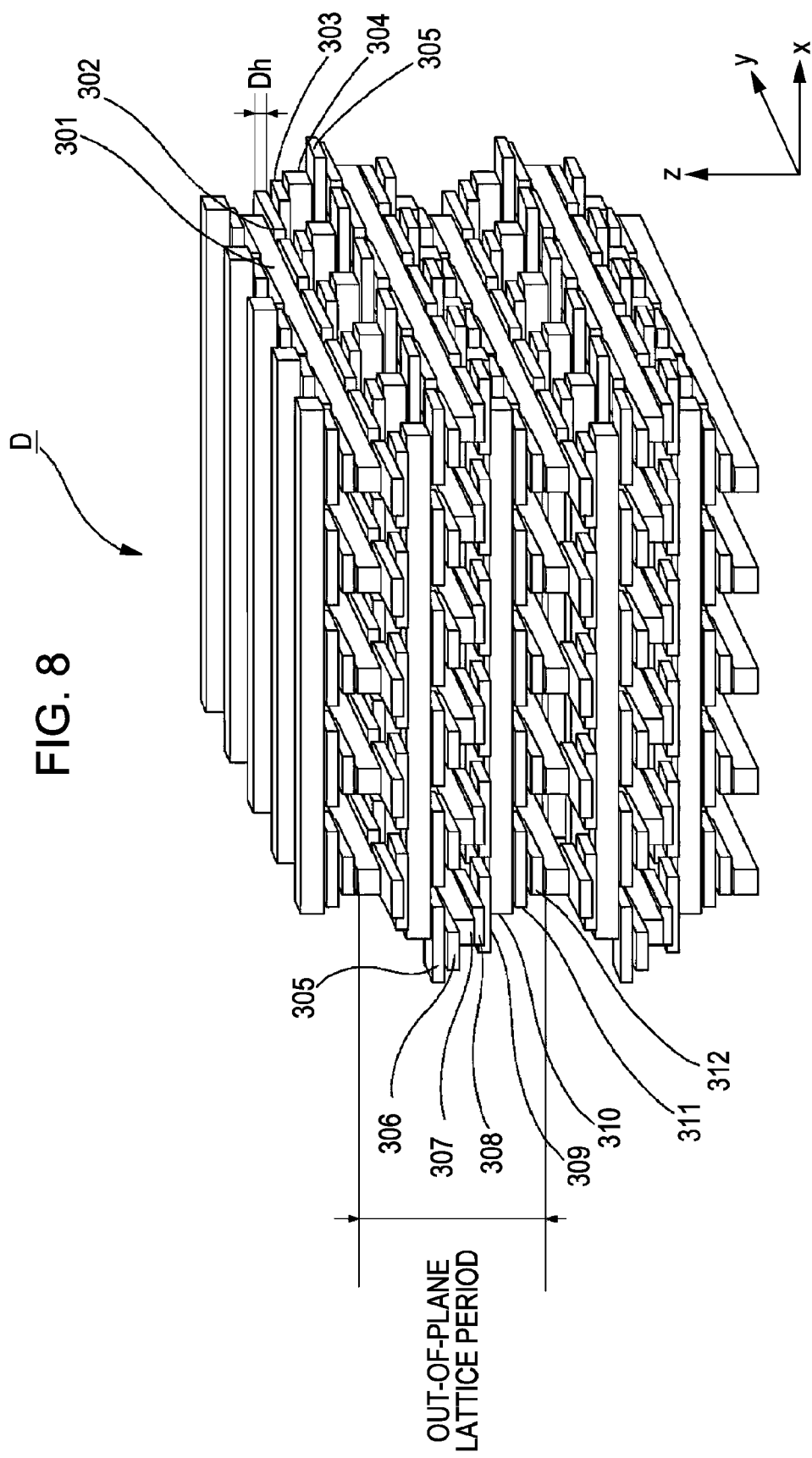
FIG. 8 is a schematic diagram of another photonic crystal having a woodpile structure.
Figure 9:
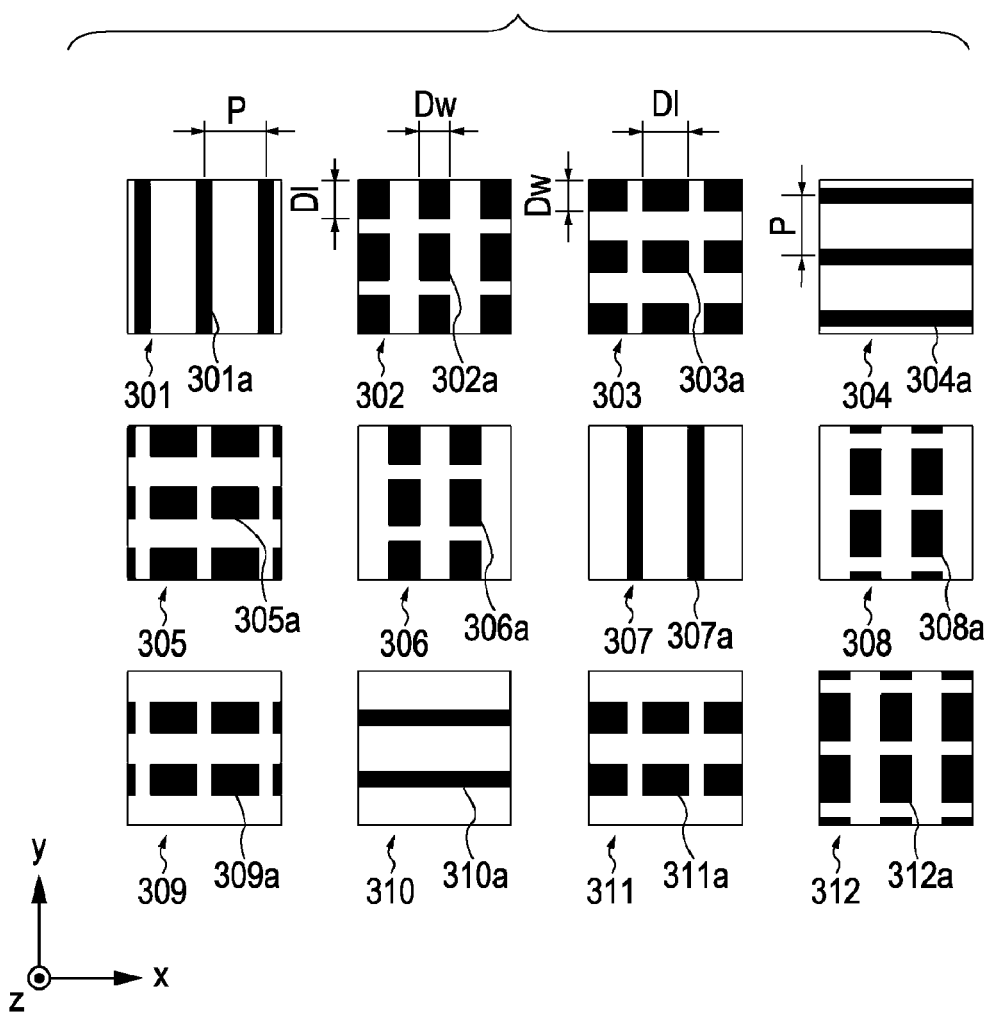
FIG. 9 is a set of schematic diagrams illustrating layers of the photonic crystal shown in FIG. 8.

FIG. 8 is a schematic diagram of a three-dimensional photonic crystal structure D having a wider photonic bandgap than the woodpile structure A. The three-dimensional photonic crystal structure D has a regular period including a first layer 301, a second layer 302, a third layer 303, a fourth layer 304, a fifth layer 305, a sixth layer 306, a seventh layer 307, an eighth layer 308, a ninth layer 309, a tenth layer 310, an eleventh layer 311, and a twelfth layer 312 that are substantially parallel to the xy plane. FIG. 9 shows parts of xy cross sections of the twelve layers 301 to 312 in FIG. 8. The first layer 301 and the seventh layer 307 include columnar structures 301a and 307a, respectively, arranged at an interval of P in the x-axis direction so as to extend in the y-axis direction. The columnar structures 301a and 307a are shifted from each other by a distance of P/2 in the x-axis direction. The fourth layer 304 and the tenth layer 310 include columnar structures 304a and 310a, respectively, arranged at an interval of P in the y-axis direction so as to extend in the x-axis direction. The columnar structures 304a and 310a are shifted from each other by a distance of P/2 in the y-axis direction.

The second layer 302 and the third layer 303 include discrete structures 302a and 303a, respectively, disposed at positions corresponding to intersections of the columnar structures 301a of the first layer 301 and the columnar structures 304a of the fourth layer 304. Adjacent structures in a given layer are arranged so as to be isolated from one another in the xy plane. These discrete structures 302a and 303a are symmetrical, that is, the structures in the layer 302 and 303 have the same shape following a 90° relative rotation in the xy plane. Similarly, the fifth layer 305 and the sixth layer 306 are disposed between the fourth layer 304 and the seventh layer 307 and include discrete structures 305a and 306a, respectively, disposed at positions corresponding to intersections of the columnar structures 304a of the fourth layer 304 and the columnar structures 307a of the seventh layer 307 so as to be isolated from adjacent structures in the same layer in the xy plane. Similarly, the eighth layer 308 and the ninth layer 309 are disposed between the seventh layer 307 and the tenth 310 and include discrete structures 308a and 309a, respectively, disposed at positions corresponding to intersections of the columnar structures 307a of the seventh layer 307 and the columnar structures 310a of the tenth layer 310 so as to be isolated from adjacent structures in the same layer in the xy plane. Similarly, the eleventh layer 311 and the twelfth layer 312 are disposed between the tenth layer 310 and the first layer 301 and include discrete structures 311a and 312a, respectively, disposed at positions corresponding to intersections of the columnar structures 310a of the tenth layer 310 and the columnar structures 301a of the first layer 301 so as to be isolated from adjacent structures in the same layer in the xy plane.

A wide complete photonic bandgap can be achieved in a desired frequency range (wavelength range) by optimizing, for example, the refractive index of the material used for the columnar structures 301a, 304a, 307a and 310a and the discrete structures 302a, 303a, 305a, 306a, 308a, 309a, 311a, and 312a, the shapes and intervals thereof, and the thicknesses of the layers 301 to 312. The layers 302, 303, 305, 306, 308, 309, 311, and 312 include the discrete structures 302a, 303a, 305a, 306a, 308a, 309a, 311a, and 312a, respectively.

Table 4 shows structural parameters of the three-dimensional photonic crystal structure D. In Table 4, the refractive index refers to that of the medium used for the columnar structures 301a, 304a, 307a and 310a and the discrete structures 302a, 303a, 305a, 306a, 308a, 309a, 311a, and 312a of the three-dimensional photonic crystal structure D. The medium used for the portions other than the columnar structures 301a, 304a, 307a and 310a and the discrete structures 302a, 303a, 305a, 306a, 308a, 309a, 311a, and 312a is air, which has a refractive index of 1.0. The in-plane lattice period refers to the interval of the columnar structures 301a, 304a, 307a and 310a in FIG. 9, namely, P. The out-of-plane lattice period refers to the total length of the twelve layers 301 to 312 in the stacking direction in the three-dimensional photonic crystal structure D. The discrete structure length Dl refers to the length of each discrete structure in a plane parallel to the layers 301 to 312. The discrete structure width Dw refers to the width of each discrete structure in the plane parallel to the layers 301 to 312. The discrete structure height Dh refers to the height of each discrete structure in the stacking direction (z-axis direction).

TABLE 4

| Three-dimensional photonic crystal structure D Photonic crystal structure | |
|---|---|
| Refractive index | 2.4 |
| In-plane lattice period | P |
| Out-of-plane lattice period | 1.4 P |
| Columnar structure width | 0.30 P |
| Columnar structure height | 0.25 P |
| Discrete structure length Dl | 0.60 P |
| Discrete structure width Dw | 0.40 P |
| Discrete structure height Dh | 0.05 P |

Figure 10:
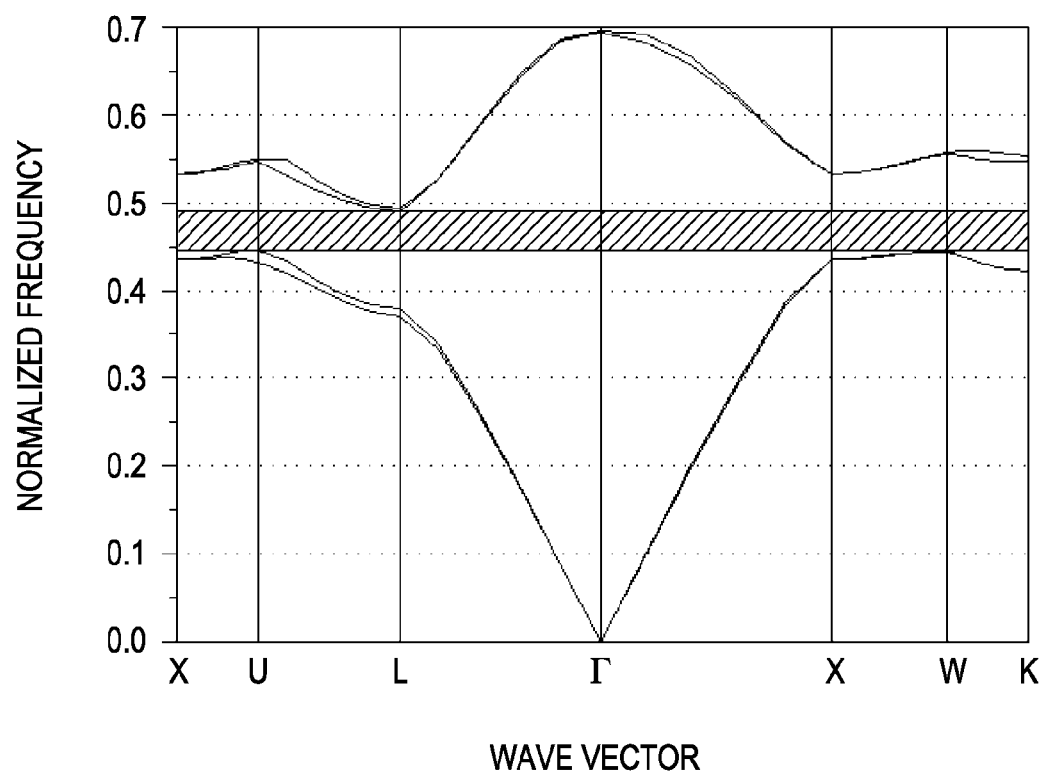
FIG. 10 is a graph showing the normalized frequency of the photonic crystal shown in FIG. 8.

FIG. 10 is a graph showing a photonic bandgap of the three-dimensional photonic crystal structure D according to calculations by the plane-wave expansion method. The horizontal and vertical axes of FIG. 10 are as defined in FIG. 3 in the first exemplary embodiment. The hatched area represents the frequency range of a complete photonic bandgap, which forbids propagation of light incident in any direction. A linear defect formed in the three-dimensional photonic crystal D creates a propagation mode in the complete photonic bandgap.

FIGS. 11A to 11D are schematic diagrams of a waveguide structure E according to the second exemplary embodiment of the present invention. This waveguide structure E is produced by forming a first linear defect 40 and second linear defects 400 to 403 in the three-dimensional photonic crystal structure D. The first linear defect 40 extends in the y-axis direction and is formed by partially removing a columnar structure of a layer and discrete structures of two layers disposed above the layer and two layers disposed below the layer. The second linear defects 400 to 403 are formed at parts of columnar structures also extending in the y-axis direction.

Figure 11A:
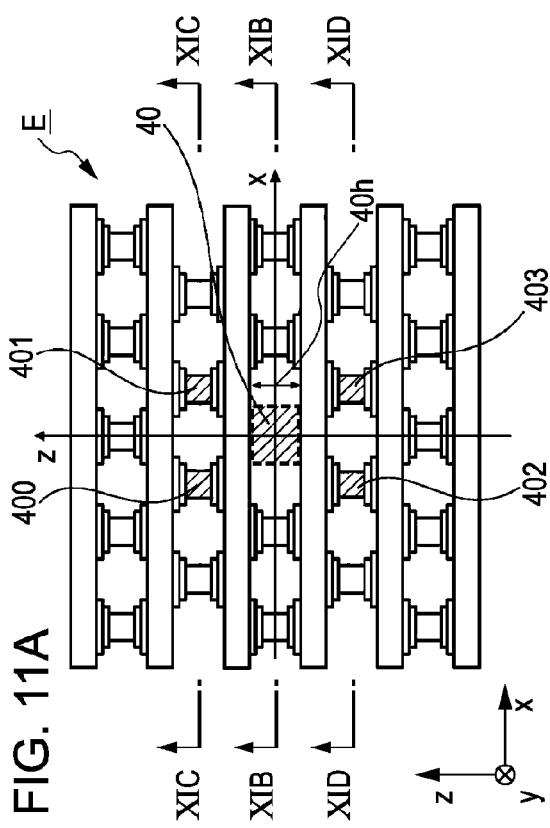
FIGS. 11A to 11D are schematic diagrams of a waveguide structure according to a second exemplary embodiment of the present invention.
Figure 11B:
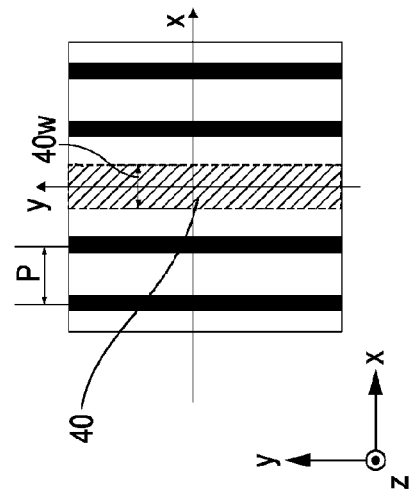
Figure 11D:
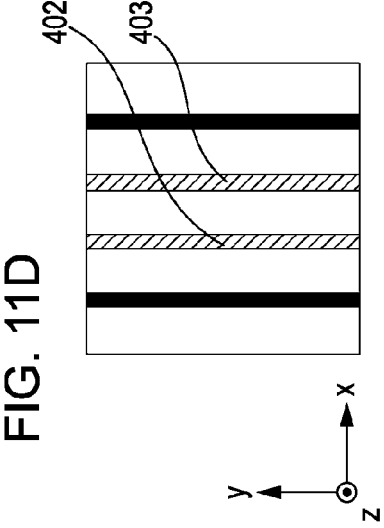
Figure 11C:
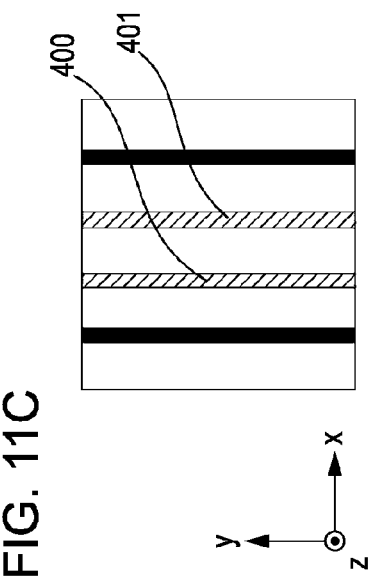

FIG. 11A is a sectional view of the waveguide structure E which is taken along the xz plane. FIGS. 11B, 11C, and 11D are sectional views of the waveguide structure E which are taken along lines XIB, XIC, and XID, respectively, of FIG. 11A. Table 5 shows structural parameters of the waveguide structure E. In this exemplary embodiment, the second linear defects 400 to 403 are formed of a medium with a refractive index of about 2.0. The origin of coordinates is the center of the first linear defect 40 in the xz plane. In Table 5 and FIGS. 11A to 11D, the defect height 40h refers to the height of the first linear defect 40 in the stacking direction (z-axis direction), which is equal to the total thickness of the layer containing the first linear defect 20, the two layers disposed above the layer, and the two layers disposed below the layer. The defect width 40w refers to the width of the first linear defect 40 in the x-axis direction, which is equal to the discrete structure length Dl. The defect refractive indices 40n, 400n, 401n, 402n, and 403n refer to the refractive indices of the linear defects 40, 400, 401, 402, and 403, respectively.

TABLE 5

| Waveguide structure E | |
|---|---|
| Photonic crystal structure D | |
| Refractive index | 2.4 |
| In-plane lattice period | P |
| Out-of-plane lattice period | 1.4 P |
| Columnar structure width | 0.30 P |
| Columnar structure height | 0.25 P |
| Discrete structure length Dl | 0.60 P |

TABLE 5-continued

| Waveguide structure E | |
|---|---|
| Discrete structure width Dw | 0.40 P |
| Discrete structure height Dh | 0.05 P |
| First linear defect 40 | |
| Center coordinates (x, z) | (0.00 P, 0.00 P) |
| Defect refractive index 40n | 1.0 |
| Defect width 40 w | 0.60 P |
| Defect height 40 h | 0.45 P |
| Second linear defect 400 | |
| Center coordinates (x, z) | (−0.50 P, 0.70 P) |
| Defect refractive index 400n | 2.0 |
| Second linear defect 401 | |
| Center coordinates (x, z) | (0.50 P, 0.70 P) |
| Defect refractive index 401n | 2.0 |
| Second linear defect 402 | |
| Center coordinates (x, z) | (−0.50 P, −0.70 P) |
| Defect refractive index 402n | 2.0 |
| Second linear defect 403 | |
| Center coordinates (x, z) | (0.50 P, −0.70 P) |
| Defect refractive index 403n | 2.0 |

Figure 12A:
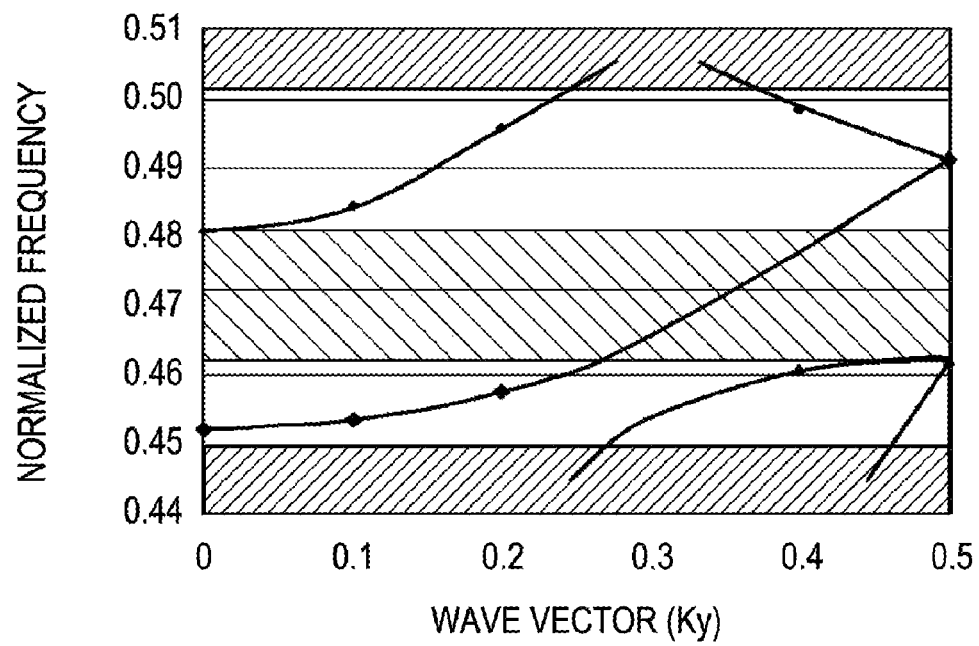
FIGS. 12A and 12B are a graph and a diagram, respectively, showing propagation modes of the waveguide structure according to the second exemplary embodiment.

FIG. 12A is a graph showing propagation modes of the waveguide structure E according to calculations by the FDTD method. The horizontal and vertical axes of FIG. 12A are as defined in the first exemplary embodiment. The marginal hatched areas represent the frequency ranges other than a complete photonic bandgap. The central hatched area represents a frequency range that facilitates single-mode propagation, namely, from about 0.462 to about 0.481. If the first linear defect 40 is formed in the waveguide structure E without the second linear defects 400 to 403, the frequency range that facilitates single-mode propagation is calculated to be about 0.452 to about 0.466 according to the FDTD method. These results demonstrate that the second linear defects 400 to 403 facilitate single-mode propagation over a wider frequency range.

Figure 12B:
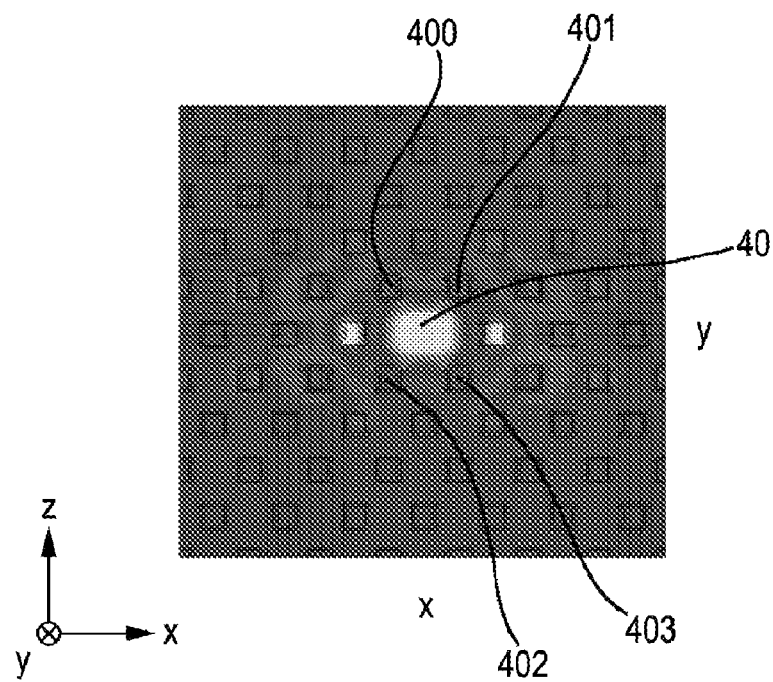

FIG. 12B shows the electromagnetic field intensity distribution of a propagation mode in the frequency range that facilitates single-mode propagation in the xz plane. The white areas represent higher electromagnetic field intensity. FIG. 12B shows a single-peaked electromagnetic field intensity distribution that is highly concentrated around the center of the waveguide structure E.

Figure 13:
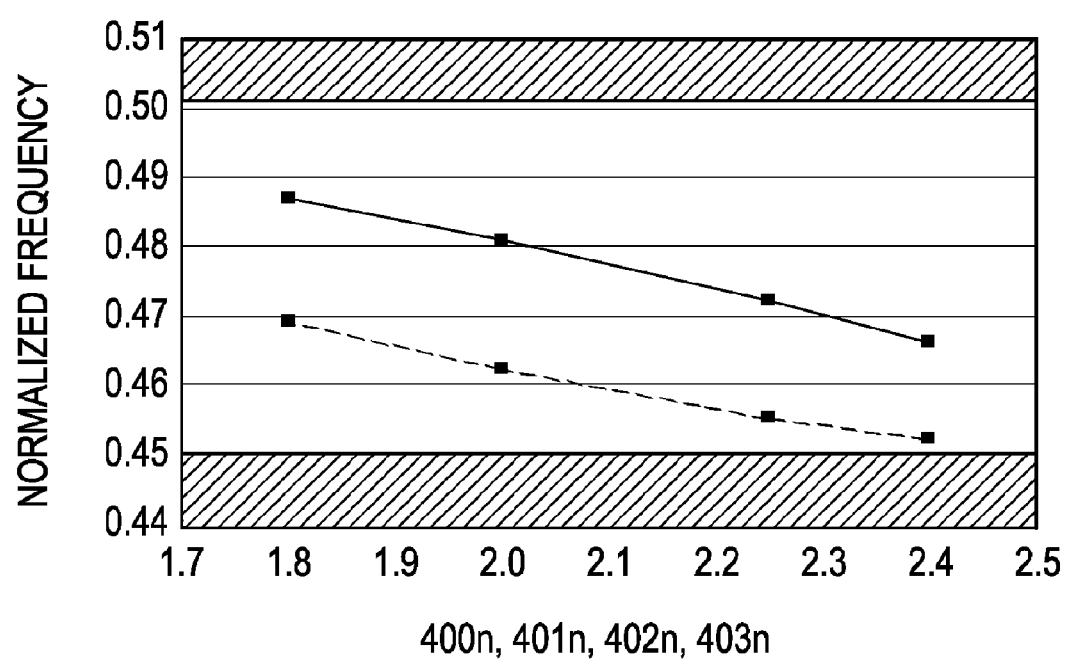
FIG. 13 is a graph showing the normalized frequency of the waveguide structure according to the second exemplary embodiment.

FIG. 13 is a graph showing variations in the frequency range that facilitates single-mode propagation after the defect refractive indices 400n to 403n are simultaneously changed in equal amounts. In FIG. 13, the horizontal axis represents defect refractive indices, and the vertical axis represents normalized frequencies. The solid line represents the high-frequency side of the frequency range that facilitates single-mode propagation, and the broken line represents the low-frequency side thereof. The area defined between these lines represents the frequency range that facilitates single-mode propagation. FIG. 13 shows that the frequency range that facilitates single-mode propagation varies with the defect refractive indices 400n to 403n.

The defect refractive indices 400n to 403n can be changed by selecting the medium used for the second linear defects 400 to 403 to control the frequency range that facilitates single-mode propagation. The reason why the frequency range that facilitates single-mode propagation can be controlled to provide a nearly single-peaked intensity distribution in a plane perpendicular to the propagation direction is as described in the first exemplary embodiment.

The second linear defects 400 to 403 are formed in the columnar structures closest to the first linear defect 40 in this exemplary embodiment, although they can also be formed in other columnar structures. For example, as described in the first exemplary embodiment, similar effects can be achieved if the second linear defects 400 to 403 are formed in columnar structures disposed farther away from the first linear defect 40 in the layers closest to the first linear defect 40 which include columnar structures extending in the longitudinal direction of the first linear defect 40.

Also, similar effects can be achieved if the second linear defects 400 to 403 are formed in columnar structures included in layers disposed farther away from the first linear defect 40 in the stacking direction. An effective range of distance between the first linear defect 40 and the second linear defects 400 to 403 in the stacking direction is up to about 1.5 times the out-of-plane lattice period. The number of second linear defects is not limited to this exemplary embodiment. In addition, the second linear defects 400 to 403 can be formed of media with different refractive indices. More exact control of the positions, number, and medium of the second linear defects 400 to 403 permits more exact control of mode frequency.

Next, another waveguide structure F according to this exemplary embodiment will be described. This waveguide structure F is produced using the three-dimensional photonic crystal structure D shown in FIG. 8. The waveguide structure F includes second linear defects formed in discrete structures, rather than in columnar structures extending in the longitudinal direction of a first linear defect, or in both the discrete structures and the columnar structures. The waveguide structure F facilitates control of the frequency range that facilitates single-mode propagation.

FIGS. 14A to 14D are schematic diagrams of the waveguide structure F. This waveguide structure F is produced by forming a first linear defect 50 and second linear defects 500 to 503 in the three-dimensional photonic crystal structure D shown in FIG. 8. The first linear defect 50 extends in the y-axis direction and is formed in the same manner as the first linear defect 40 in the waveguide structure E. The second linear defects 500 to 503 are formed at parts of discrete structures included in layers different from a layer containing the first linear defect 50 and have a refractive index different from that of the discrete structures. FIGS. 14B to 14D illustrate the structures of the layers containing the second linear defects 500 to 503. The second linear defects 500 to 503 are formed of a medium with a refractive index different from that of the columnar structures and the discrete structures of the three-dimensional photonic crystal structure D.

FIG. 14A is a sectional view of the waveguide structure F which is taken along the xz plane. FIGS. 14B, 14C, and 14D are sectional views of the waveguide structure F which are taken along lines XIVB, XIVC, and XIVD, respectively, of FIG. 14A. In this exemplary embodiment, the second linear defects 500 to 503 are formed in discrete structures close to the first linear defect 50.

Table 6 shows structural parameters of the waveguide structure F. In Table 6 and FIGS. 14A to 14D, the defect height 50$h$ refers to the height of the first linear defect 50, which is equal to the total thickness of the layer containing the first linear defect 50, the two layers disposed above the layer, and the two layers disposed below the layer. The defect width 50$w$ refers to the width of the first linear defect 50. The defect refractive indices 50$n$, 500$n$, 501$n$, 502$n$, and 503$n$ refer to the refractive indices of the linear defects 50, 500, 501, 502, and 503, respectively. Propagation modes are calculated by the FDTD method as described above.

TABLE 6

| Waveguide structure F | |
|---|---|
| Photonic crystal structure D | |
| Refractive index | 2.4 |
| In-plane lattice period | P |
| Out-of-plane lattice period | 1.4 P |
| Columnar structure width | 0.30 P |
| Columnar structure height | 0.25 P |
| Discrete structure length Dl | 0.60 P |
| Discrete structure width Dw | 0.40 P |
| Discrete structure height Dh | 0.05 P |
| First linear defect 50 | |
| Center coordinates (x, z) | (0.00 P, 0.00 P) |
| Defect refractive index 50n | 1.0 |
| Defect width 50 w | 0.60 P |
| Defect height 50 h | 0.45 P |
| Second linear defect 500 | |
| Center coordinates (x, z) | (−0.50 P, 0.85 P) |
| Defect refractive index 500n | 1.2-2.0 |
| Second linear defect 501 | |
| Center coordinates (x, z) | (0.50 P, 0.85 P) |
| Defect refractive index 501n | 1.2-2.0 |
| Second linear defect 502 | |
| Center coordinates (x, z) | (−0.50 P, −0.85 P) |
| Defect refractive index 502n | 1.2- 2.0 |
| Second linear defect 503 | |
| Center coordinates (x, z) | (0.50 P, −0.85 P) |
| Defect refractive index 503n | 1.2-2.0 |

Figure 15:
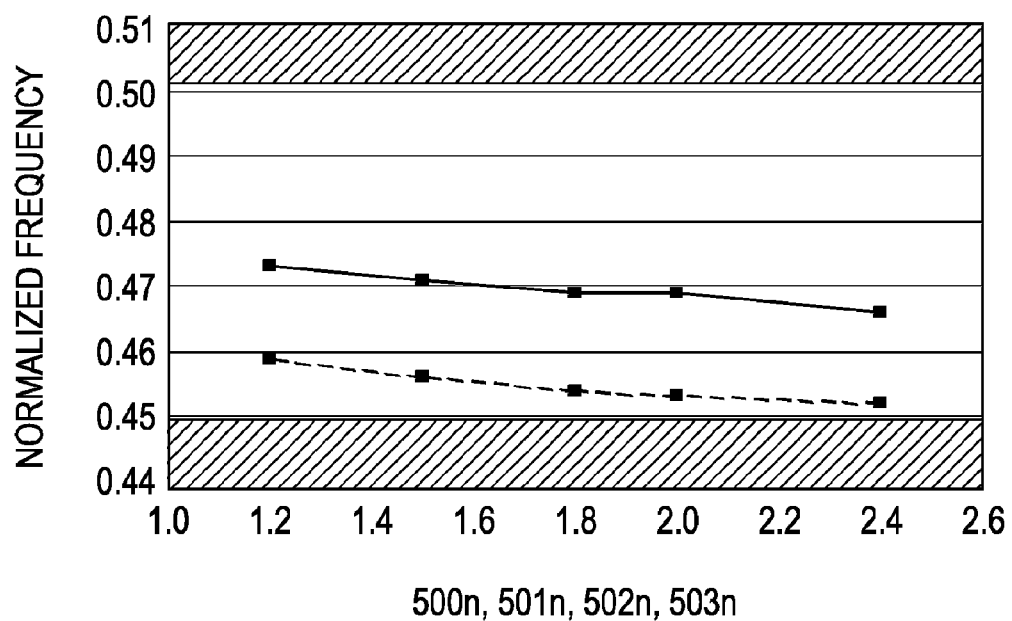
FIG. 15 is a graph showing the normalized frequency of the waveguide structure according to the second exemplary embodiment.

FIG. 15 is a graph showing variations in the frequency range that facilitates single-mode propagation after the defect refractive indices 500$n$ to 503$n$ are simultaneously changed in equal amounts. In FIG. 15, the horizontal axis represents defect refractive indices, and the vertical axis represents normalized frequencies. The solid line represents the high-frequency side of the frequency range that facilitates single-mode propagation, and the broken line represents the low-frequency side thereof. FIG. 15 shows that the frequency range that facilitates single-mode propagation varies with the defect refractive indices 500$n$ to 503$n$.

The defect refractive indices 500$n$ to 503$n$ can be changed by selecting the medium used for the second linear defects 500 to 503 to control the frequency range that facilitates single-mode propagation. The second linear defects 500 to 503 can also be formed in other discrete structures. For example, similar effects can be achieved if the second linear defects 500 to 503 are formed in discrete structures disposed farther away from the first linear defect 50, or at discrete structures included in layers disposed farther away from the first linear defect 50 which are adjacent to columnar structures extending in the y-axis direction. An effective range of distance between the first linear defect 50 and the second linear defects 500 to 503 in the stacking direction is about 0.5 to about 1.5 times the out-of-plane lattice period. If the second linear defects 500 to 503 are separated from the first linear defect 50 by a distance of less than about 0.5 times the out-of-plane lattice period, a propagation mode with a single-peaked electromagnetic field intensity distribution in a plane perpendicular to the propagation direction is difficult to achieve. If the second linear defects 500 to 503 are separated from the first linear defect 50 by a distance of more than about 1.5 times the out-of-plane lattice period, the second linear defects 500 to 503 have little effect.

In addition, the second linear defects 500 to 503 can be formed in both the columnar structures and the discrete structures. The number of second linear defects is not limited to this exemplary embodiment. The second linear defects 500 to 503 can be formed of media with different refractive indices.

The first linear defect 20, which is formed by partially removing a columnar structure and nearby discrete structures in this exemplary embodiment, can be formed by partially removing a columnar structure alone or together with discrete structures.

As in the first exemplary embodiment, the second exemplary embodiment is independent of the refractive index of the medium used for a photonic crystal. For example, Table 7 shows structural parameters of a waveguide structure G having the same structure as the waveguide structure E shown in FIGS. 11A to 11D. This waveguide structure G includes a three-dimensional photonic crystal formed of a medium having a refractive index of about 3.6. The frequency range that facilitates single-mode propagation can be controlled using second linear defects, as described below. Propagation modes are calculated by the FDTD method as described above.

TABLE 7

| Waveguide structure G | |
|---|---|
| Photonic crystal structure D | |
| Refractive index | 3.6 |
| In-plane lattice period | P |
| Out-of-plane lattice period | 1.4 P |
| Columnar structure width | 0.25 P |
| Columnar structure height | 0.25 P |
| Discrete structure length Dl | 0.60 P |
| Discrete structure width Dw | 0.40 P |
| Discrete structure height Dh | 0.05 P |
| First linear defect 40 | |
| Center coordinates (x, z) | (0.00 P, 0.00 P) |
| Defect refractive index 40n | 1.0 |
| Defect width 40 w | 0.60 P |
| Defect height 40 h | 0.45 P |
| Second linear defect 400 | |
| Center coordinates (x, z) | (−0.50 P, 0.70 P) |
| Defect refractive index 400n | 3.0-3.4 |
| Second linear defect 401 | |
| Center coordinates (x, z) | (0.50 P, 0.70 P) |
| Defect refractive index 401n | 3.0-3.4 |
| Second linear defect 402 | |
| Center coordinates (x, z) | (−0.50 P, −0.70 P) |
| Defect refractive index 402n | 3.0-3.4 |
| Second linear defect 403 | |
| Center coordinates (x, z) | (0.50 P, −0.70 P) |
| Defect refractive index 403n | 3.0-3.4 |

Figure 16:
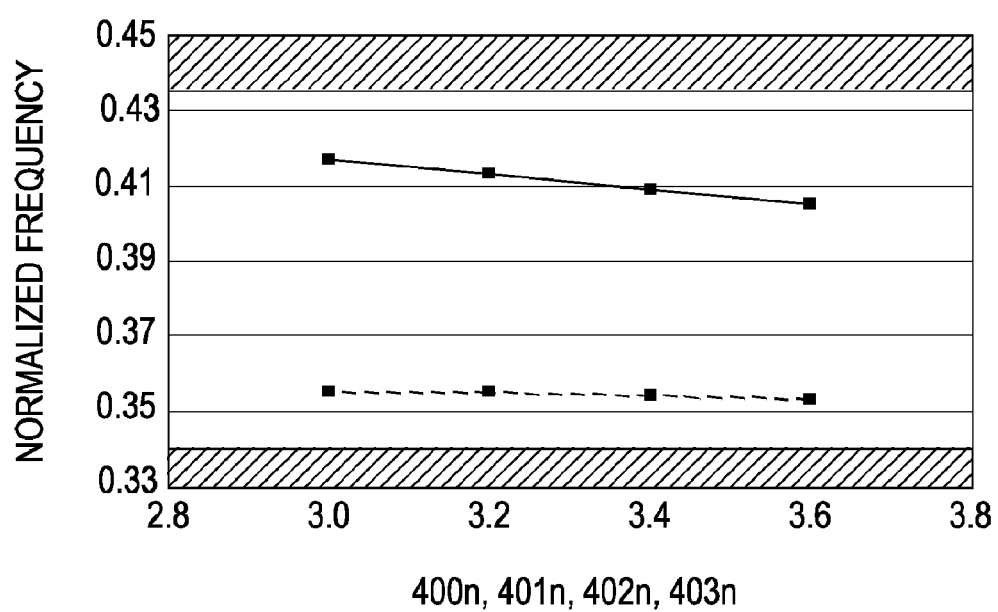
FIG. 16 is a graph showing the normalized frequency of another waveguide structure according to the second exemplary embodiment.

FIG. 16 is a graph showing variations in the frequency range that facilitates single-mode propagation after the defect refractive indices 400n to 403n are simultaneously changed in equal amounts. The horizontal axis represents defect refractive indices, and the vertical axis represents normalized frequencies.

In FIG. 16, the solid line represents the high-frequency side of the frequency range that facilitates single-mode propagation, and the broken line represents the low-frequency side thereof. The frequency range that facilitates single-mode propagation varies with the defect refractive indices 400n to 403n. Hence, the defect refractive indices 400n to 403n can be changed by selecting the medium used for the second linear defects 400 to 403 to control the frequency range that facilitates single-mode propagation independently of the refractive index of the medium used for the three-dimensional photonic crystal.

In this exemplary embodiment, as described above, a waveguide structure can be produced by forming defects in the three-dimensional photonic crystal structure D to provide a waveguide that facilitates single-mode propagation with a desired intensity distribution in a desired frequency range.

Media that can be used for production of three-dimensional photonic crystal waveguide structures as described above are as described in the first exemplary embodiment. The medium used for a first linear defect is not limited to air and can be any of the low-refractive-index materials described in the first exemplary embodiment. Such waveguide structures can be produced by the same process as in the first exemplary embodiment.

The three-dimensional photonic crystal structure D used in the second exemplary embodiment includes additional layers including two sublayers including discrete structures, although this exemplary embodiment is not limited to the photonic crystal structure D. For example, similar effects can be achieved if linear defects are formed at the positions described above in a three-dimensional photonic crystal structure including additional layers including one, three, or more sublayers including discrete structures or in a three-dimensional photonic crystal structure including an additional layer on either side of each layer including columnar structures.

Figure 23A:
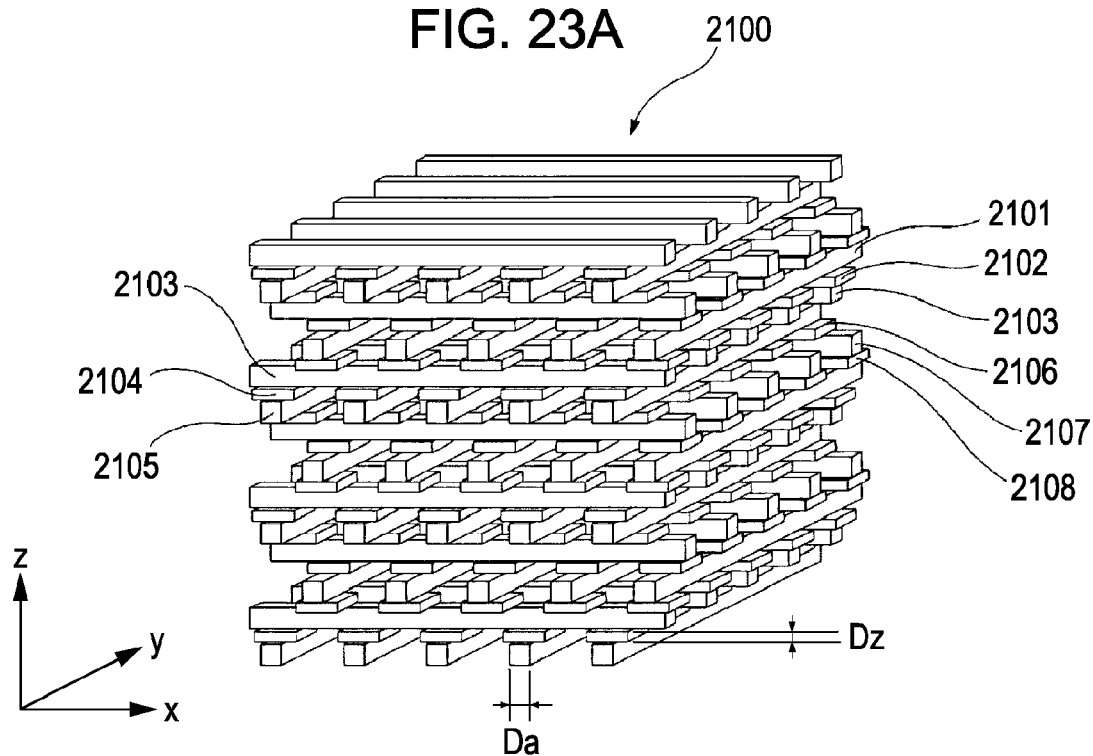
FIG. 23A is a schematic diagram of a photonic crystal including discrete structures.

FIG. 23A is a schematic diagram of a three-dimensional photonic crystal structure 2100 including additional layers including a single sublayer including discrete structures. The three-dimensional photonic crystal structure 2100 has a regular period including a first layer 2101, a second layer 2102, a third layer 2103, a fourth layer 2104, a fifth layer 2105, a sixth layer 2106, a seventh layer 2107, and an eighth layer 2108 that are parallel to the xy plane.

Figure 23B:
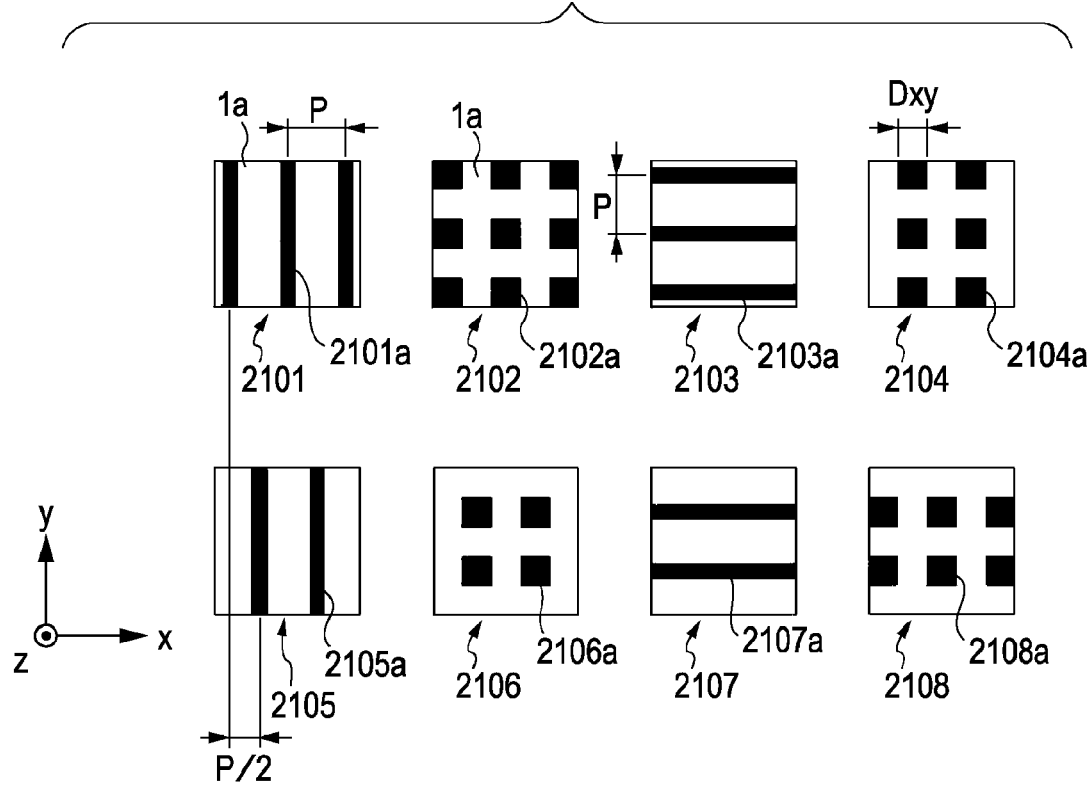
FIG. 23B is a set of schematic diagrams illustrating layers of the photonic crystal shown in FIG. 23A.

FIG. 23B shows parts of xy cross sections of the eight layers 2101 to 2108. The first layer 2101 and the fifth layer 2105 include columnar structures 2101a and 2105a, respectively, arranged at an interval of P in the x-axis direction so as to extend in the y-axis direction. The columnar structures 2101a and 2105a are formed of a first medium with a high refractive index and are shifted from each other by a distance of P/2 in the x-axis direction. The third layer 2103 and the seventh layer 2107 include columnar structures 2103a and 2107a, respectively, arranged at an interval of P in the y-axis direction so as to extend in the x-axis direction. The columnar structures 2103a and 2107a are formed of the first medium and are shifted from each other by a distance of P/2 in the y-axis direction.

The second layer 2102 includes discrete structures 2102a disposed at positions corresponding to intersections of the columnar structures 2101a of the first layer 2101 and the columnar structures 2103a of the third layer 2103 so as to be isolated from each other in the xy plane. These discrete structures 2102a are formed of the first medium. Similarly, the fourth layer 2104 is disposed between the third layer 2103 and the fifth layer 2105 and includes discrete structures 2104a disposed at positions corresponding to intersections of the columnar structures 2103a of the third layer 2103 and the columnar structures 2105a of the fifth layer 2105 so as to be isolated from each other in the xy plane. Similarly, the sixth layer 2106 is disposed between the fifth layer 2105 and the seventh layer 2107 and includes discrete structures 2106a disposed at positions corresponding to intersections of the columnar structures 2105a of the fifth layer 2105 and the columnar structures 2107a of the seventh layer 2107 so as to be isolated from each other in the xy plane. Similarly, the eighth layer 2108 is disposed between the seventh layer 2107 and the first layer 2101 and includes discrete structures 2108a disposed at positions corresponding to intersections of the columnar structures 2107a of the seventh layer 2107 and the columnar structures 2101a of the first layer 2101 so as to be isolated from each other in the xy plane. The discrete structures 2104a, 2106a, and 2108a have the same shape as the discrete structures 2102a and are formed of the first medium.

The columnar structures 2101a, 2103a, 2105a, and 2107a and the discrete structures 2102a, 2104a, 2106a, and 2108a are disposed in contact with each other, and the other area 1a in each layer is filled with a second medium with a low refractive index.

Figure 24A:
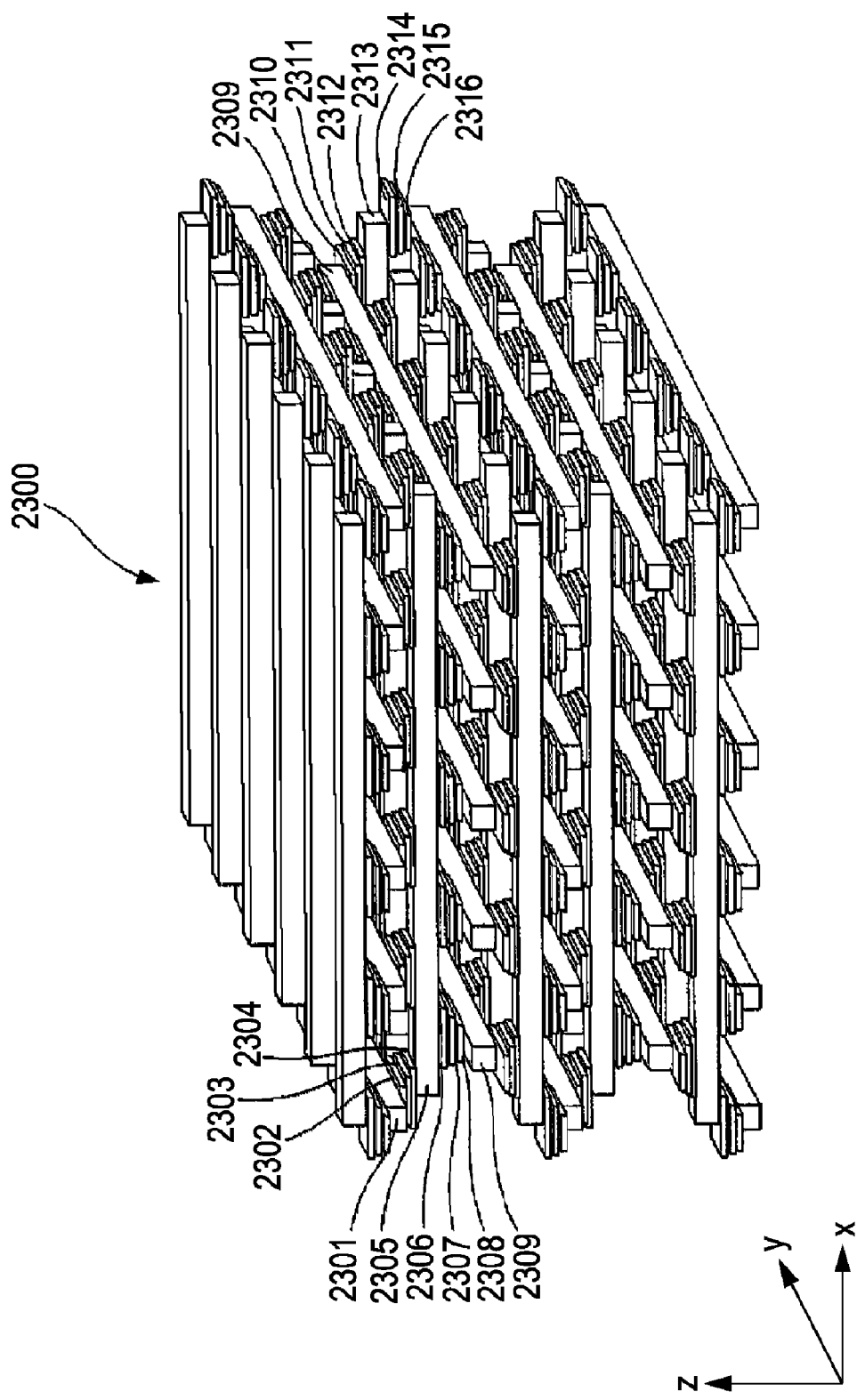
FIG. 24A is a schematic diagram of another photonic crystal including discrete structures.

FIG. 24A is a schematic diagram of a three-dimensional photonic crystal structure 2300 including additional layers including three sublayers including discrete structures. The three-dimensional photonic crystal structure 2300 has a regular period including a first layer 2301, a second layer 2302, a third layer 2303, a fourth layer 2304, a fifth layer 2305, a sixth layer 2306, a seventh layer 2307, an eighth layer 2308, a ninth layer 2309, a tenth layer 2310, an eleventh layer 2311, a twelfth layer 2312, a thirteenth layer 2313, a fourteenth layer 2314, a fifteenth layer 2315, and a sixteenth layer 2316 that are parallel to the xy plane.

FIG. 24B shows parts of xy cross sections of the sixteen layers 2301 to 2316. The first layer 2301 and the ninth layer 2309 include columnar structures 2301a and 2309a, respectively, arranged at an interval of P in the x-axis direction so as to extend in the y-axis direction. The columnar structures 2301a and 2309a are formed of the first medium and are shifted from each other by a distance of P/2 in the x-axis direction. The fifth layer 2305 and the thirteenth layer 2313 include columnar structures 2305a and 2313a, respectively, arranged at an interval of P in the y-axis direction so as to extend in the x-axis direction. The columnar structures 2305a and 2313a are formed of the first medium and are shifted from each other by a distance of P/2 in the y-axis direction.

The second layer 2302, the third layer 2303, and the fourth layer 2304 include discrete structures 2302a, 2303a, and 2304a, respectively, disposed at positions corresponding to intersections of the columnar structures 2301a of the first layer 2301 and the columnar structures 2305a of the fifth layer 2305 so as to be isolated from each other in the xy plane. These discrete structures 2302a, 2303a, and 2304a are formed of the first medium. The discrete structures 2302a and 2304a are symmetrical, that is, their shape would coincide with each other after about 90° relative rotation in the xy plane.

Similarly, the sixth layer 2306, the seventh layer 2307, and the eighth layer 2308 are disposed between the fifth layer 2305 and the ninth layer 2309 and include discrete structures 2306a, 2307a, and 2308a, respectively, disposed at positions corresponding to intersections of the columnar structures 2305a of the fifth layer 2305 and the columnar structures 2309a of the ninth layer 2309 so as to be isolated from each other in the xy plane. Similarly, the tenth layer 2310, the eleventh layer 2311, and the twelfth layer 2312 are disposed between the ninth layer 2309 and the thirteenth layer 2313 and include discrete structures 2310a, 2311a, and 2312a, respectively, disposed at positions corresponding to intersections of the columnar structures 2309a of the ninth layer 2309 and the columnar structures 2313a of the thirteenth layer 2313 so as to be isolated from each other in the xy plane. Similarly, the fourteenth layer 2314, the fifteenth layer 2315a, and the sixteenth layer 2316 are disposed between the thirteenth layer 2313 and the first layer 2301 and include discrete structures 2314a, 2315a, and 2316a, respectively, disposed at positions corresponding to intersections of the columnar structures 2313a of the thirteenth layer 2313 and the columnar structures 2301a of the first layer 2301 so as to be isolated from each other in the xy plane. The discrete structures 2306a to 2308a, 2310a to 2312a, and 2314a to 2316a are formed of the first medium.

The columnar structures 2301a, 2305a, 2309a, and 2313a and the discrete structures 2302a to 2304a, 2306a to 2308a, 2310a to 2312a, and 2314a to 2316a are disposed in contact with each other, and the other area in each layer is filled with the second medium. A significantly wide complete photonic bandgap can be achieved in a desired frequency range (wavelength range) by optimizing, for example, the refractive indices of the first and second media, the shapes and intervals of the columnar structures 2301a, 2305a, 2309a, and 2313a and the discrete structures 2302a to 2304a, 2306a to 2308a, 2310a to 2312a, and 2314a to 2316a, and the thicknesses of the layers 2301 to 2316.

As in FIG. 23A, the shapes, orientations, intervals, and medium of the columnar structures 2301a, 2305a, 2309a, and 2313a and the discrete structures 2302a to 2304a, 2306a to 2308a, 2310a to 2312a, and 2314a to 2316a are not limited to the example above.

The discrete structures of the three sublayers of each additional layer can have different areas in the xy plane. For example, additional layers including three sublayers having areas varying along the z-axis direction can be provided.

A still wider complete photonic bandgap can be achieved if the additional layers each include four or more sublayers including discrete structures, although such a structure requires a complicated production process. The number of sublayers can thus be selected according to purpose.

As described above, a photonic crystal structure including layers including discrete structures between layers including columnar structures arranged in parallel at a predetermined interval can provide a wider complete photonic bandgap than known structures.

Third Exemplary Embodiment

Devices including a waveguide according to a third exemplary embodiment of the present invention will be described below.

First, light-emitting devices will be described. A linear defect serving as a waveguide and a point defect are formed in a three-dimensional photonic crystal.

A resonator having a resonant mode at a desired frequency in a photonic bandgap can be formed by optimizing the shape and medium of the point defect.

A light-emitting medium having an emission spectrum covering the resonant wavelength can be disposed in the resonator to provide a highly efficient light-emitting device, such as a laser or a light-emitting diode (LED). This device can be driven by supplying an external energy such as electromagnetic waves or current to the light-emitting medium.

If a waveguide having a propagation mode at the frequency of the resonant mode of the resonator is disposed near the point-defect resonator, light generated inside the resonator can be coupled to the propagation mode to exit the resonator.

The light propagates as the propagation mode through the waveguide to reach an end thereof where the light is coupled to a mode that propagates through a free space outside the three-dimensional photonic crystal, so that the light can exit the crystal.

FIGS. 17A and 17B show an example of a light-emitting device including a waveguide according to this exemplary embodiment and a point defect having an active portion that emits light when supplied with carriers.

A light-emitting device 600 includes a resonator 601a, a p-type electrode 602, a p-type carrier channel 603, an n-type electrode 604, and an n-type carrier channel 605. The resonator 601a is provided by forming a point defect 601 in a three-dimensional photonic crystal structure. An active portion that emits light when supplied with carriers is formed in the resonator 601a.

Holes are supplied to the resonator 601a through the p-type electrode 602 and the p-type carrier channel 603 while electrons are supplied to the resonator 601a through the n-type electrode 604 and the n-type carrier channel 605. These holes and electrons are coupled inside the resonator 601a to emit light, causing laser oscillation.

The light-emitting device 600 further includes a waveguide 606 for outputting the light from the resonator 601a. This waveguide 606 is provided by forming a first linear defect 607 and second linear defects 608 and 609. The first linear defect 607 is formed by removing part of a columnar structure of the three-dimensional photonic crystal. The second linear defects 608 and 609 are formed in a layer different from a layer containing the first linear defect 607.

The refractive indices of the second linear defects 608 and 609 can be optimized by selecting the medium used therefor to achieve single-mode propagation at the frequency of the resonant mode of the resonator 601a.

The waveguide 606 can be disposed at an appropriate position relative to the resonator 601a to efficiently convert the resonant mode of the resonator 601a into a propagation mode and output it from an end of the waveguide 606 to the outside of the three-dimensional photonic crystal.

The waveguide 606 thus facilitates control of the propagation mode so that the frequency range that facilitates single-mode propagation covers the frequency of the resonant mode.

In addition, the waveguide 606 has a propagation mode with an electromagnetic field intensity concentrated in the center of the waveguide 606 in a plane perpendicular to the propagation direction.

The waveguide 606 can thus output light having no asymmetrical distortion in its electromagnetic field intensity distribution from an end thereof.

As described above, a high-performance light-emitting device can be achieved with a combination of a waveguide according to this exemplary embodiment and a point-defect resonator.

FIGS. 18A and 18B show an example of a light-emitting device including a waveguide including a linear defect containing an active medium according to this exemplary embodiment and an excitation device for exciting the active medium.

A light-emitting device 700 includes a waveguide 706 provided in a three-dimensional photonic crystal structure.

In the example of FIGS. 18A and 18B, the waveguide 706 is provided by forming a first linear defect 707 and second linear defects 708 and 709. The first linear defect 707 is formed by removing part of a columnar structure of the three-dimensional photonic crystal.

The second linear defects 708 and 709 are formed at parts of columnar structures extending in the longitudinal direction of the first linear defect 707 in a layer different from a layer containing the first linear defect 707.

The second linear defects 708 and 709 are formed of a medium with a refractive index different from that of the columnar structures of the three-dimensional photonic crystal structure.

Three-dimensional photonic crystals 710 and 711 are disposed outside the waveguide 706 to provide highly reflective surfaces at both ends thereof.

An active portion 701 that emits light when supplied with carriers is formed in the first linear defect 707. The light-emitting device 700 further includes a p-type electrode 702, a p-type carrier channel 703, an n-type electrode 704, and an n-type carrier channel 705.

Holes are supplied to the first linear defect 707 through the p-type electrode 702 and the p-type carrier channel 703 while electrons are supplied to the first linear defect 707 through the n-type electrode 704 and the n-type carrier channel 705. These holes and electrons are coupled inside the first linear defect 707 to emit light.

The light emitted from the active portion 701 propagates through the first linear defect 707 and is reflected on the end surfaces of the waveguide 706, thus reciprocating inside the first linear defect 707.

The emitted light causes resonance and laser oscillation in the first linear defect 707 if the length of the waveguide 706 in the propagation direction and structural parameters thereof are appropriately designed so as to meet the resonance conditions for the propagation mode of the light.

The waveguide 706 has a propagation mode with an electromagnetic field intensity concentrated in the center of the waveguide 706 in a plane perpendicular to the propagation direction. The waveguide 706 can thus output light having no asymmetrical distortion in its electromagnetic field intensity distribution from an end thereof.

In addition, the refractive indices of the second linear defects 708 and 709 can be changed by selecting the medium used therefor to facilitate control of mode frequency so that the waveguide 706 can meet the resonance conditions for light of any wavelength to cause laser oscillation.

As described above, a high-performance laser device can be achieved with a combination of a waveguide including a linear defect containing an active medium according to this exemplary embodiment and an excitation device for exciting the active medium.

In this exemplary embodiment, various light-emitting media can be selected according to the desired oscillation wavelength, including compound semiconductors, inorganic light-emitting materials, organic light-emitting materials, light-emitting polymers, quantum dots, and nanocrystals.

The excitation method used can be, for example, optical excitation using an external light source or exciting by current injection. In exciting by current injection, a light-emitting medium can be held between electrodes formed of a metal, such as Al or Cr, or a transparent conductive material, such as indium tin oxide (ITO).

In addition, independently operable electrodes can be provided to resonators to independently control light emitted from the individual resonators.

Such a device can be used as a light source for applications including displays, optical communications devices, terahertz applications, and optical pickups for media such as DVDs and next-generation blue light recording media.

FIGS. 19A and 19B show an example of a drop circuit including a linear-defect waveguide according to this exemplary embodiment and point-defect resonators.

A drop circuit 800 includes a waveguide provided in a three-dimensional photonic crystal structure.

In the example of FIGS. 19A and 19B, the waveguide is provided by forming a first linear defect 801 and second linear defects 802 and 803. The first linear defect 801 is formed by removing part of a columnar structure of the three-dimensional photonic crystal.

The second linear defects 802 and 803 are formed at parts of columnar structures extending in the longitudinal direction of the first linear defect 801 in a layer different from a layer containing the first linear defect 801.

The second linear defects 802 and 803 are formed of a medium with a refractive index different from that of the columnar structures and discrete structures of the three-dimensional photonic crystal structure.

The drop circuit 800 further includes point-defect resonators 804 to 807 near the waveguide.

Although only the resonators 804 to 807 are illustrated in FIGS. 19A and 19B, n resonators are actually provided for n wavelengths to be demultiplexed to achieve desired optical demultiplexing.

The resonators are designed to operate at different resonant wavelengths. The waveguide is designed to facilitate single-mode propagation over a wavelength range covering the wavelengths to be demultiplexed. The propagation mode can be controlled so as to facilitate single-mode propagation over a wavelength range covering the resonant wavelengths by adjusting the positions, number, and medium of the second linear defects.

Figure 20:
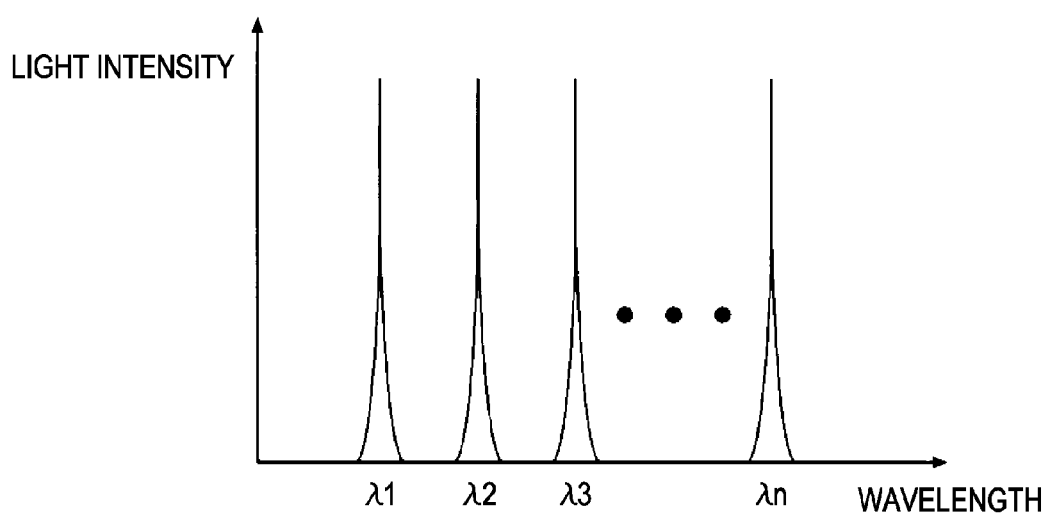
FIG. 20 is a spectrum graph of a light beam used in the third exemplary embodiment.
Figure 21B:
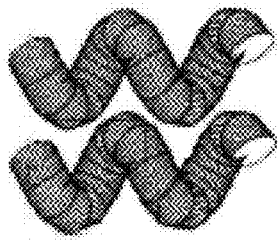
FIGS. 21A to 21F are schematic diagrams of known photonic crystals.
Figure 21C:
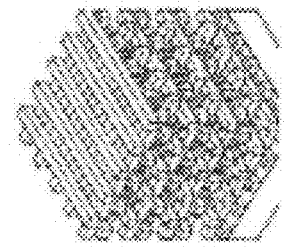
Figure 21A:
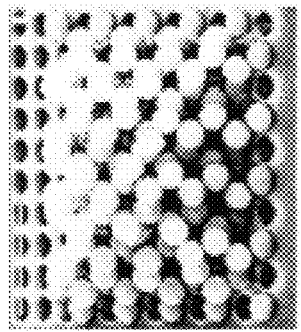
Figure 21F:
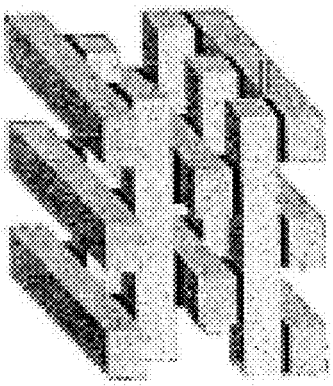
Figure 21E:
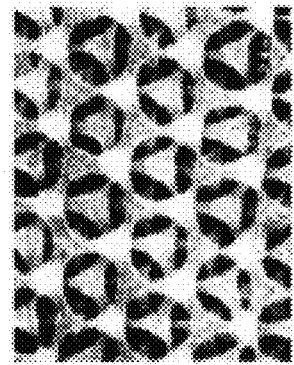
Figure 21D:
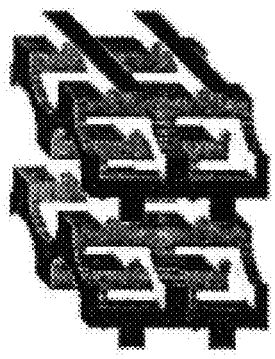
Figure 22A:
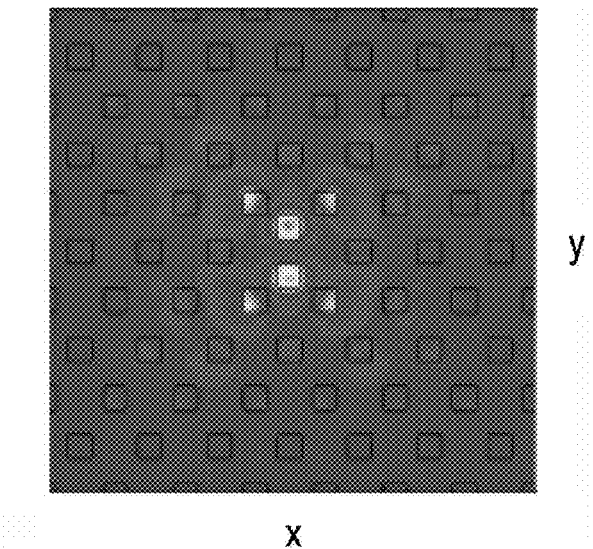
FIGS. 22A and 22B are diagrams showing the electromagnetic field intensity distribution of a known photonic crystal.
Figure 22B:
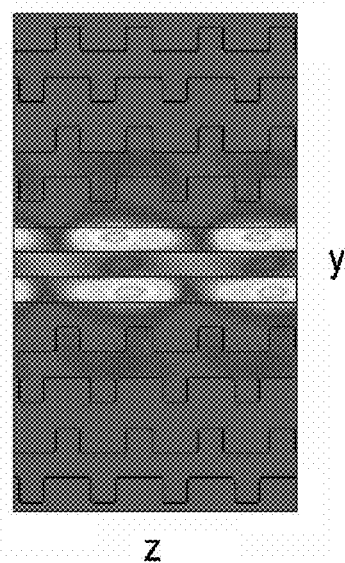

A light beam having a spectrum shown in FIG. 20 is guided into the waveguide. The spectrum of the light beam has peaks at the resonant wavelengths $\lambda 1$ to $\lambda n$ of the point-defect resonators. The resonators can then output light components having wavelengths corresponding to the resonant wavelengths $\lambda 1$ to $\lambda n$.

Conversely, light beams can be introduced through the resonators and multiplexed in the waveguide.

Such an optical device is particularly useful as an add-drop device for use in optical communication bands.

Accordingly, a three-dimensional photonic crystal waveguide according to this exemplary embodiment can be used to provide a high-performance drop element capable of demultiplexing at a desired wavelength range.

As described above, a wavelength filter including a linear-defect waveguide according to this exemplary embodiment and point-defect resonators can be used to provide a high-performance add-drop circuit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-329024 filed Nov. 14, 2005, which is hereby incorporated by reference herein in its entirety.

What is claimed is:

1. A waveguide comprising a three-dimensional photonic crystal including:
    a first layer including columnar structures arranged at a predetermined interval;
    a second layer including columnar structures arranged at the interval so as to extend in a direction different from the longitudinal direction of the columnar structures of the first layer;
    a third layer including columnar structures arranged at the interval so as to extend in the longitudinal direction of the columnar structures of the first layer, the columnar structures of the third layer being shifted from the columnar structures of the first layer by half the interval in a direction perpendicular to the longitudinal direction thereof;
    a fourth layer including columnar structures arranged at the interval so as to extend in the longitudinal direction of the columnar structures of the second layer, the columnar structures of the fourth layer being shifted from the columnar structures of the second layer by half the interval in a direction perpendicular to the longitudinal direction thereof;
    a first linear defect disposed at part of the columnar structures, the first linear defect comprising a medium different from the columnar structures; and
    a second linear defect disposed at part of the columnar structures extending in the longitudinal direction of the first linear defect, the second linear defect comprising a medium having a refractive index different from that of the medium used for the columnar structures, the second linear defect being separated from the first linear defect by a distance between about 0.5 times and about 1.5 times the out-of-plane lattice period of the three-dimensional photonic crystal in a direction in which the layers are stacked, the second linear defect controlling a frequency of a mode in which light propagates through the waveguide so as to guide the light in a single mode in a desired frequency range.

2. A waveguide comprising a three-dimensional photonic crystal including:
    a first layer including columnar structures arranged at a predetermined interval;
    a second layer including columnar structures arranged at the interval so as to extend in a direction different from the longitudinal direction of the columnar structures of the first layer;
    a third layer including columnar structures arranged at the interval so as to extend in the longitudinal direction of the columnar structures of the first layer, the columnar structures of the third layer being shifted from the columnar structures of the first layer by half the interval in a direction perpendicular to the longitudinal direction thereof;
    a fourth layer including columnar structures arranged at the interval so as to extend in the longitudinal direction of the columnar structures of the second layer, the columnar structures of the fourth layer being shifted from the columnar structures of the second layer by half the interval in a direction perpendicular to the longitudinal direction thereof;
    additional layers disposed between the first to fourth layers, each additional layer including at least one sublayer including discrete structures isolated from each other in a plane parallel to at least one of the first to fourth layers, the discrete structures being disposed at positions corresponding to intersections of projections of the columnar structures in at least two of the first to fourth layers;
    a first linear defect disposed at part of the columnar structures or at part of the columnar structures and part of the discrete structures of one or both of the additional layers adjacent to the part of the columnar structures, the first linear defect comprising a medium different from the columnar structures and the discrete structures; and
    a second linear defect disposed at part of the columnar structures extending in the longitudinal direction of the first linear defect, the second linear defect comprising a medium having a refractive index different from that of the medium used for the columnar structures, the second linear defect being separated from the first linear defect by a distance between about 0.5 times and about 1.5 times the out-of-plane lattice period of the three-dimensional photonic crystal in a direction in which the layers are stacked, the second linear defect controlling a frequency of a mode in which light propagates through the waveguide so as to guide the light in a single mode in a desired frequency range.

3. A waveguide comprising a three-dimensional photonic crystal including:

a first layer including columnar structures arranged at a predetermined interval;

a second layer including columnar structures arranged at the interval so as to extend in a direction different from the longitudinal direction of the columnar structures of the first layer;

a third layer including columnar structures arranged at the interval so as to extend in the longitudinal direction of the columnar structures of the first layer, the columnar structures of the third layer being shifted from the columnar structures of the first layer by half the interval in a direction perpendicular to the longitudinal direction thereof;

a fourth layer including columnar structures arranged at the interval so as to extend in the longitudinal direction of the columnar structures of the second layer, the columnar structures of the fourth layer being shifted from the columnar structures of the second layer by half the interval in a direction perpendicular to the longitudinal direction thereof;

additional layers disposed between the first to fourth layers, each additional layer including at least one sublayer including discrete structures isolated from each other in a plane parallel to at least one of the first to fourth layers, the discrete structures being disposed at positions corresponding to intersections of projections of the columnar structures in at least two of the first to fourth layers;

a first linear defect disposed at part of the columnar structures or at part of the columnar structures and part of the discrete structures of one or both of the additional layers adjacent to the part of the columnar structures, the first linear defect comprising a medium different from the columnar structures and the discrete structures; and a second linear defect disposed at part of the discrete structures, the second linear defect comprising a medium having a refractive index different from that of the medium used for the discrete structures, the second linear defect being separated from the first linear defect by a distance between about 0.5 times and about 1.5 times the out-of-plane lattice period of the three-dimensional photonic crystal in a direction in which the layers are stacked, the second linear defect controlling a frequency of a mode in which light propagates through the waveguide so as to guide the light in a single mode in a desired frequency range.

4. A waveguide comprising a three-dimensional photonic crystal including:

a first layer including columnar structures arranged at a predetermined interval;

a second layer including columnar structures arranged at the interval so as to extend in a direction different from the longitudinal direction of the columnar structures of the first layer;

a third layer including columnar structures arranged at the interval so as to extend in the longitudinal direction of the columnar structures of the first layer, the columnar structures of the third layer being shifted from the columnar structures of the first layer by half the interval in a direction perpendicular to the longitudinal direction thereof;

a fourth layer including columnar structures arranged at the interval so as to extend in the longitudinal direction of the columnar structures of the second layer, the columnar structures of the fourth layer being shifted from the columnar structures of the second layer by half the interval in a direction perpendicular to the longitudinal direction thereof;

additional layers disposed between the first to fourth layers, each additional layer including at least one sublayer including discrete structures isolated from each other in a plane parallel to at least one of the first to fourth layers, the discrete structures being disposed at positions corresponding to intersections of projections of the columnar structures in at least two of the first to fourth layers;

a first linear defect disposed at part of the columnar structures or at part of the columnar structures and part of the discrete structures of one or both of the additional layers adjacent to the part of the columnar structures, the first linear defect comprising a medium different from the columnar structures and the discrete structures; and a second linear defect disposed at part of the columnar structures extending in the longitudinal direction of the first linear defect and part of the discrete structures, the second linear defect comprising a medium having a refractive index different from that of the medium used for the columnar structures and that of the medium used for the discrete structures, the second linear defect being separated from the first linear defect by a distance between about 0.5 times and about 1.5 times the out-of-plane lattice period of the three-dimensional photonic crystal in a direction in which the layers are stacked, the second linear defect controlling a frequency of a mode in which light propagates through the waveguide so as to guide the light in a single mode in a desired frequency range.

5. The waveguide according to claim 1, wherein the second linear defect is disposed in a columnar structure closest to the first linear defect.

6. A light-emitting device comprising:
the waveguide according to claim 1; and
a resonator for emitting light propagating through the waveguide, comprising a point defect in the three-dimensional photonic crystal.

7. A light-emitting device comprising:
the waveguide according to claim 1;
an active medium provided for the first or second linear defect; and
an excitation device for exciting the active medium.

8. An add-drop circuit comprising:
the waveguide according to claim 1; and
resonators for emitting light propagating through the waveguide, each comprising a point defect in the three-dimensional photonic crystal.

9. The waveguide according to claim 2, wherein the second linear defect is disposed in a columnar structure closest to the first linear defect.

10. The waveguide according to claim 4, wherein the second linear defect is disposed in a columnar structure closest to the first linear defect.

11. A light-emitting device comprising:
the waveguide according to claim 2; and
a resonator for emitting light propagating through the waveguide, comprising a point defect in the three-dimensional photonic crystal.

12. A light-emitting device comprising:
the waveguide according to claim 3; and
a resonator for emitting light propagating through the waveguide, comprising a point defect in the three-dimensional photonic crystal.

13. A light-emitting device comprising:
the waveguide according to claim 4; and
a resonator for emitting light propagating through the waveguide, comprising a point defect in the three-dimensional photonic crystal.

14. A light-emitting device comprising:
the waveguide according to claim 2;
an active medium provided for the first or second linear defect; and
an excitation device for exciting the active medium.

15. A light-emitting device comprising:
the waveguide according to claim 3;
an active medium provided for the first or second linear defect; and
an excitation device for exciting the active medium.

16. A light-emitting device comprising:
the waveguide according to claim 4;
an active medium provided for the first or second linear defect; and
an excitation device for exciting the active medium.

17. An add-drop circuit comprising:
the waveguide according to claim 2; and
resonators for emitting light propagating through the waveguide, each comprising a point defect in the three-dimensional photonic crystal.

18. An add-drop circuit comprising:
the waveguide according to claim 3; and
resonators for emitting light propagating through the waveguide, each comprising a point defect in the three-dimensional photonic crystal.

19. An add-drop circuit comprising:
the waveguide according to claim 4; and
resonators for emitting light propagating through the waveguide, each comprising a point defect in the three-dimensional photonic crystal.

* * * * *